(12) United States Patent
Yamamoto et al.

(10) Patent No.: US 10,283,823 B2
(45) Date of Patent: May 7, 2019

(54) ENERGY STORAGE APPARATUS

(71) Applicants: GS Yuasa International Ltd., Kyoto-shi, Kyoto (JP); Honda Motor Co., Ltd., Tokyo (JP)

(72) Inventors: Yuta Yamamoto, Kyoto (JP); Motoki Hoshino, Kyoto (JP); Masao Kawata, Saitama (JP); Jun Machida, Saitama (JP)

(73) Assignees: GS YUASA INTERNATIONAL LTD., Kyoto-Shi, Kyoto (JP); HONDA MOTOR CO., LTD., Tokyo (JP)

( * ) Notice: Subject to any disclaimer, the term of this patent is extended or adjusted under 35 U.S.C. 154(b) by 752 days.

(21) Appl. No.: 14/811,676

(22) Filed: Jul. 28, 2015

(65) Prior Publication Data

US 2016/0036103 A1  Feb. 4, 2016

(30) Foreign Application Priority Data

Jul. 30, 2014 (JP) ................................. 2014-155008
Jul. 30, 2014 (JP) ................................. 2014-155009
Jul. 30, 2014 (JP) ................................. 2014-155010

(51) Int. Cl.
*H01M 10/6556* (2014.01)
*H01M 2/10* (2006.01)
*H01M 10/613* (2014.01)

(52) U.S. Cl.
CPC ..... *H01M 10/6556* (2015.04); *H01M 2/1077* (2013.01); *H01M 2/1094* (2013.01); *H01M 10/613* (2015.04)

(58) Field of Classification Search
CPC .......... H01M 10/613; H01M 10/6556; H01M 2/1077; H01M 2/1094
See application file for complete search history.

(56) References Cited

U.S. PATENT DOCUMENTS 9,455,095 B2    9/2016   Ishibashi et al.
2010/0190049 A1  7/2010   Kawase et al.
(Continued)

FOREIGN PATENT DOCUMENTS

JP    2008-130374 A    6/2008
JP    2008-159439 A    7/2008
(Continued)

*Primary Examiner* — Barbara L Gilliam
*Assistant Examiner* — Adam A Arciero
(74) *Attorney, Agent, or Firm* — McGinn I. P. Law Group, PLLC.

(57) ABSTRACT

Provided is an energy storage apparatus where a cooling fluid minimally leaks to the outside from a passage formed between an outer spacer and an energy storage device. The energy storage apparatus includes: an energy storage device; an outer spacer arranged adjacently to the energy storage device; and an end plate arranged such that the outer spacer is sandwiched between the energy storage device and the end plate, wherein the outer spacer includes: a base extending along the energy storage device, the base defining, with the energy storage device, a passage; and a seal portion projecting from the base and being in contact with the energy storage device, wherein the end plate includes a pressing portion disposed at a position corresponding to the seal portion, the pressing portion pressing the seal portion toward the energy storage device via the base.

18 Claims, 23 Drawing Sheets

(56) References Cited

U.S. PATENT DOCUMENTS

| | | | |
|---|---|---|---|
| 2012/0064386 A1* | 3/2012 | Oguri | H01M 2/1016 429/156 |
| 2012/0141855 A1* | 6/2012 | Okada | H01M 2/1077 429/99 |
| 2013/0157103 A1 | 6/2013 | Osakabe et al. | |
| 2013/0164592 A1 | 6/2013 | Maguire et al. | |
| 2013/0273397 A1 | 10/2013 | Watanabe et al. | |
| 2014/0127548 A1 | 5/2014 | Ishibashi et al. | |
| 2014/0127553 A1 | 5/2014 | Ishibashi et al. | |
| 2014/0295227 A1 | 10/2014 | Aoki | |
| 2015/0140408 A1 | 5/2015 | Hayashida et al. | |
| 2015/0147613 A1 | 5/2015 | Hayashida et al. | |

FOREIGN PATENT DOCUMENTS

| | | |
|---|---|---|
| JP | 2009-026703 A | 2/2009 |
| JP | 2009-277471 A | 11/2009 |
| JP | 2010-170870 A | 8/2010 |
| JP | 2012-054053 A | 3/2012 |
| JP | 2012-123905 A | 6/2012 |
| JP | 2012-129043 A | 7/2012 |
| JP | 2012-160347 A | 8/2012 |
| JP | 2013-004341 A | 1/2013 |
| JP | 2014-035969 A | 2/2014 |
| JP | 2014-082170 A | 5/2014 |
| JP | 2014-093276 A | 5/2014 |
| JP | 2014-093278 A | 5/2014 |
| WO | WO-2013/073046 A1 | 5/2013 |
| WO | WO-2013/179797 A1 | 12/2013 |
| WO | WO-2013/179798 A1 | 12/2013 |

* cited by examiner

ENERGY STORAGE APPARATUS

CROSS-REFERENCE TO RELATED APPLICATIONS

This application claims the benefit of Japanese patent applications No. 2014-155008, No. 2014-155009 and No. 2014-155010, filed on Jul. 30, 2014, which are incorporated by reference.

FIELD

The present invention relates to an energy storage apparatus provided with an energy storage device.

BACKGROUND

Conventionally, there has been known an assembled battery provided with a plurality of battery cells (see JP-A-2012-123905). To be more specific, such an assembled battery includes: a battery stack which is formed by stacking a plurality of battery cells in a predetermined direction; a pair of endplates arranged on both end surfaces of the battery stack in the stacking direction; and a binding bar which integrally connects the plurality of battery cells to each other by connecting the pair of endplates. In such an assembled battery, between the battery stack and the endplate, that is, between the outermost battery cell in the stacking direction and the endplate, a separator is arranged.

The endplate extends in the plane direction orthogonal to the stacking direction of the battery cells, and presses the separator to the outermost battery cell. In this case, the endplate presses the separator to the outermost battery cell with an approximately uniform force at respective positions in the above-mentioned plane direction.

The separator has a rectangular corrugated cross-sectional shape. Accordingly, when the separator is pressed to the outermost battery cell by the endplate, gas flow gaps are formed between the outermost battery cell and the separator. Although heat is generated by the battery cells when the assembled battery is used, the battery cells can be cooled by allowing a cooling gas to pass through the gas flow gaps.

When charge-discharge cycles of each battery cell are repeated in the above-mentioned assembled battery, an electrode assembly accommodated in the inside of a case of the battery cell is inflated so that a center portion of the battery cell (case) bulges. As described previously, the endplate presses the separator to the outermost battery cell with an approximately uniform force at respective positions in the plane direction. Accordingly, when the center portion of the battery cell bulges, a pressing force applied from the endplate to a peripheral portion of the separator toward the battery cell becomes small and hence, a cooling gas which passes through the gas flow gap is liable to be leaked to the outside.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention to provide an energy storage apparatus where a cooling fluid minimally leaks to the outside from a passage formed between an outer spacer and an energy storage device.

An energy storage apparatus according to an aspect of the present invention includes: an energy storage device; an outer spacer arranged adjacently to the energy storage device; and an end plate arranged such that the outer spacer is sandwiched between the energy storage device and the end plate, wherein the outer spacer includes: a base extending along the adjacent energy storage device, the base defining, with the energy storage device, a passage through which a cooling fluid passes; and a seal portion projecting from the base and being in contact with the energy storage device, and wherein the end plate includes a pressing portion disposed at a position corresponding to the seal portion, the pressing portion pressing the seal portion toward the energy storage device via the base.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
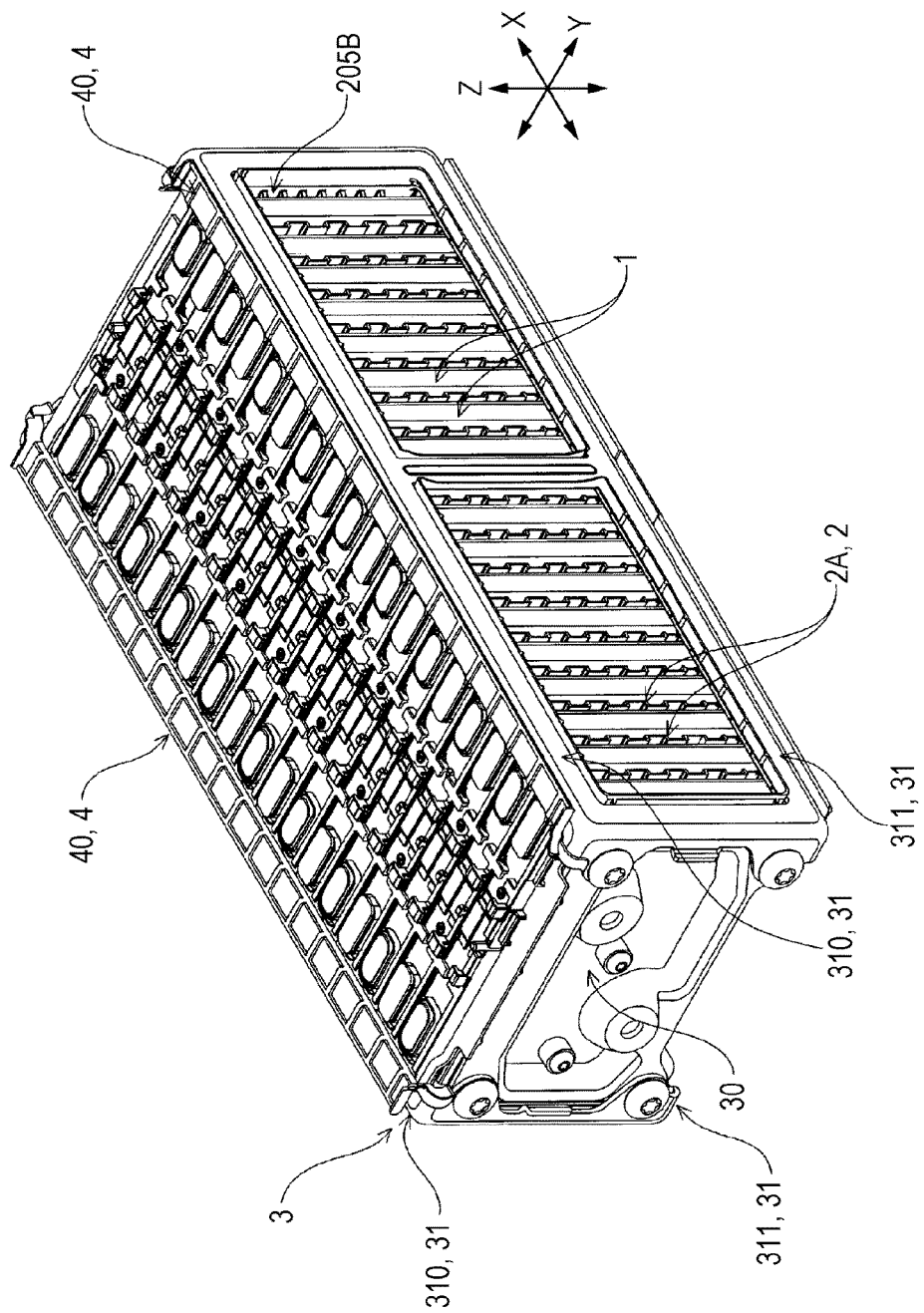
FIG. 1 is a perspective view of an energy storage apparatus according to one embodiment of the present invention.

According to an aspect of the present invention, there is provided an energy storage apparatus including: an energy storage device; an outer spacer arranged adjacently to the energy storage device; and an end plate arranged such that the outer spacer is sandwiched between the energy storage device and the end plate, wherein the outer spacer includes: a base extending along the adjacent energy storage device, the base defining, with the energy storage device, a passage through which a cooling fluid passes; and a seal portion projecting from the base and being in contact with the energy storage device, and wherein the end plate includes a pressing portion disposed at a position corresponding to the seal portion, the pressing portion pressing the seal portion toward the energy storage device via the base.

With such a configuration, the seal portion is pressed to the energy storage device by partially pressing the outer spacer (that is, by pressing only a portion of the outer spacer corresponding to the seal portion) by the pressing portion and hence, even when the deformation of the outer spacer, a change in a posture of the outer spacer with respect to the end plate or the like occurs due to the deformation or the like of the energy storage device, compared to an end plate which presses the outer spacer to an energy storage device with an approximately uniform force at respective positions in the direction along the energy storage device, a sufficient pressing force is applied to the seal portion. Accordingly, the cooling fluid minimally leaks from the passage.

In the energy storage apparatus, the pressing portion may expand along the base, and may include an edge of the end plate.

With such a configuration, the pressing portion is formed on a peripheral portion (a portion including the edge) of the end plate and hence, the pressing portion and the seal portion of the outer spacer can be provided at a peripheral portion on an opposedly facing surface of the energy storage device which opposedly faces the outer spacer. Accordingly, it is possible to suppress the influence exerted on the pressing portion and the seal portion due to bulging of the center portion of the energy storage device (above-mentioned opposedly facing surface) generated by the charge-discharge repetition. As a result, even when such bulging occurs, the seal portion is brought into sufficiently close contact with the energy storage device due to a pressing force from the pressing portion and hence, a cooling fluid minimally leaks from the passage.

In the energy storage apparatus, the outer spacer may include a protrusion which projects toward the pressing portion from a position on the base which corresponds to the seal portion.

With such a configuration, a pressing force is applied to the protrusion formed at the position corresponding to the seal portion on the base and hence, the pressing force is efficiently transmitted to the seal portion whereby the seal portion and the energy storage device are brought into sufficiently close contact with each other thus making a cooling fluid minimally leak from the passage.

In this case, the pressing portion may have an opposedly facing surface which opposedly faces the base and with which the protrusion is brought into contact, and a contact area of the protrusion with the pressing portion may be smaller than the area of the opposedly facing surface.

With such a configuration, the contact area between the outer spacer and the pressing portion can be suppressed more effectively and hence, it is possible to more effectively suppress the influence of the deformation or the like of the energy storage device exerted on the seal portion and the pressing portion whereby even when the energy storage device is deformed, it is possible to maintain the sufficient close contact between the seal portion and the energy storage device and hence, a cooling fluid minimally leaks from the passage.

In the energy storage apparatus, the seal portion and the pressing portion may extend in a flow direction of the cooling fluid in the passage.

With such a configuration, leakage of a cooling fluid toward the outside can be prevented over the whole passage in the flow direction.

In the energy storage apparatus, the end plate may include: a body which extends along the base; and a support portion which supports the pressing portion and extends toward the outer spacer from the body.

With such a configuration, the support portion extends, from the body which extends along the base, in the direction that the support portion intersects with the body and hence, rigidity of the end plate can be enhanced.

In this case, the pressing portion may extend toward a periphery of the base from a distal end of the support portion.

With such a configuration, even when the seal portion is provided on the peripheral portion of the base, the seal portion can be pressed by the pressing portion while preventing the end plate from projecting from the periphery of the outer spacer. Therefore, the energy storage device and the seal portion can be brought into firmly close contact with each other on peripheral portions of the oppositely facing surface of the energy storage device with the outer spacer without increasing the size of the energy storage apparatus. Accordingly, an arrangement (formation) region of the passage neighboring the oppositely facing surface can be increased while preventing leakage of a cooling fluid to the outside from the passage. As a result, cooling efficiency of the energy storage device can be enhanced without increasing the size of the energy storage apparatus.

As has been explained heretofore, according to the aspects of the present invention, it is possible to provide an energy storage apparatus where a cooling fluid minimally leaks to the outside from a passage formed between an outer spacer and an energy storage device.

Hereinafter, one embodiment of the present invention is described by reference to FIG. 1 to FIG. 9. Names of respective components (respective constitutional elements) of this embodiment are used only for this embodiment, and may differ from names of respective components (respective constitutional elements) in BACKGROUND.

Figure 2:
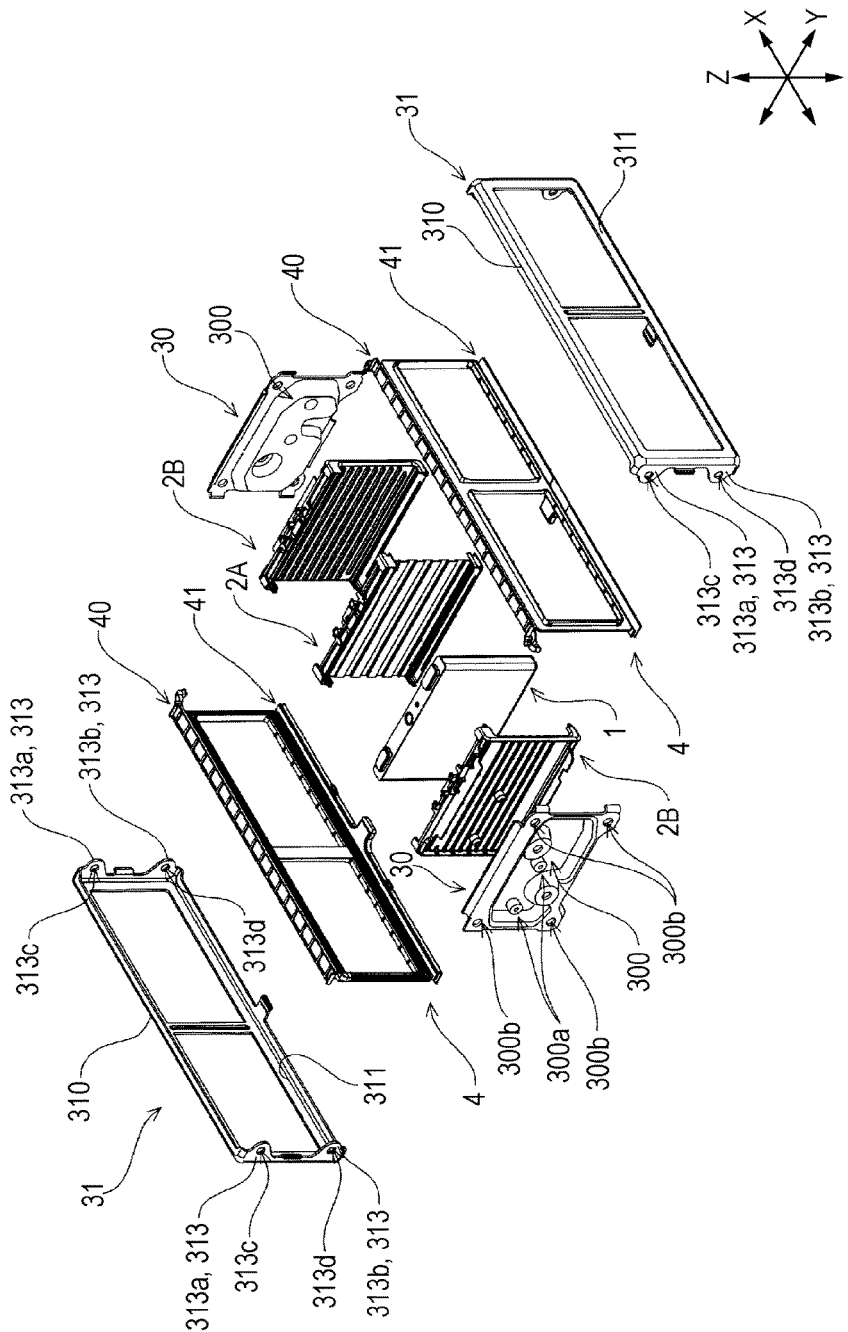
FIG. 2 is an exploded perspective view of the configuration of the energy storage apparatus partially omitted.
Figure 3:
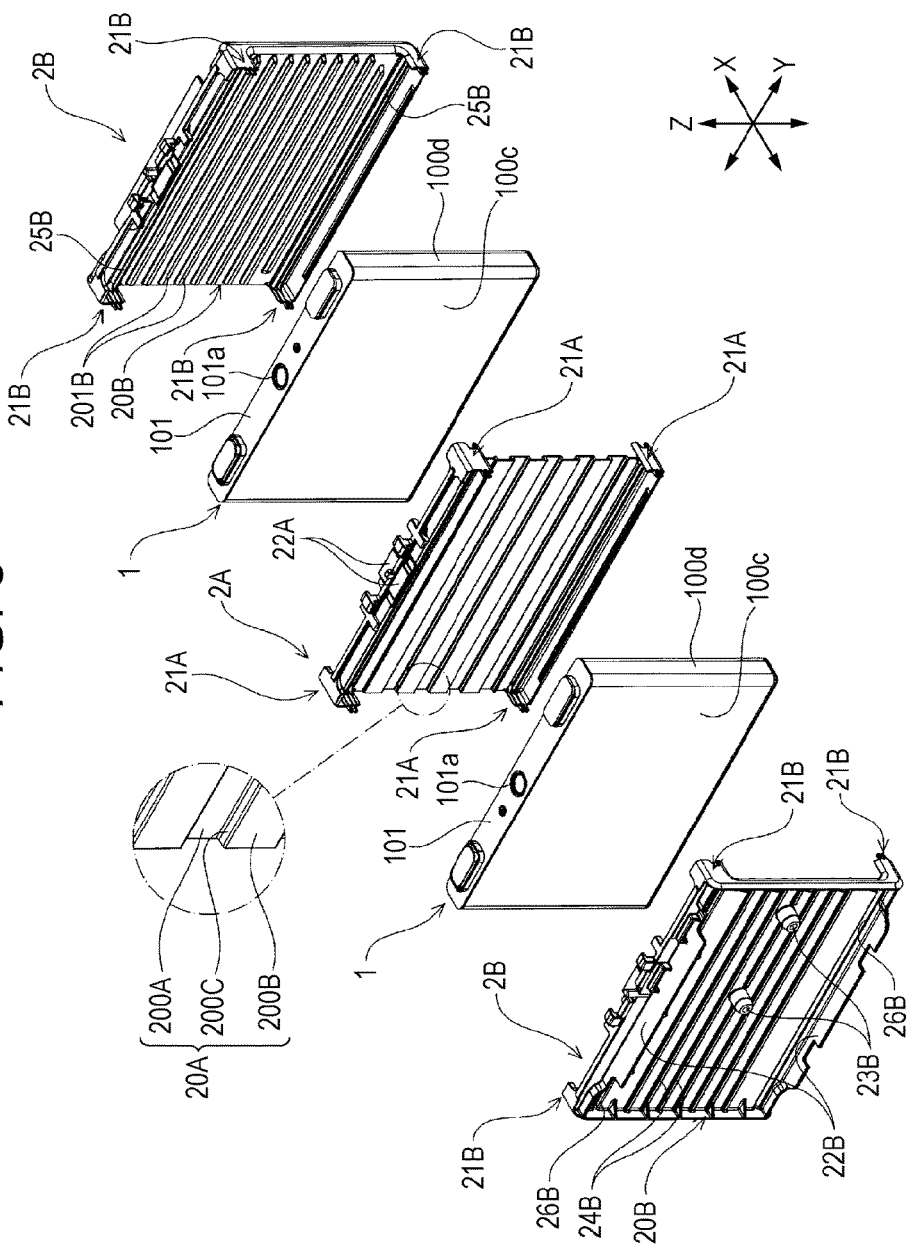
FIG. 3 is an exploded perspective view of the configuration of the energy storage apparatus partially omitted.

As shown in FIG. 1 to FIG. 3, an energy storage apparatus includes: energy storage devices 1; spacers 2 which are arranged adjacently to the energy storage devices 1; and a holder 3 which collectively holds the energy storage devices 1 and the spacers 2. The holder 3 is formed using an electrically conductive material. The energy storage apparatus also includes insulators 4 which establish insulation between the energy storage devices 1 and the holder 3. The insulators 4 are arranged between the energy storage devices 1 and the holder in the energy storage apparatus.

Figure 4:
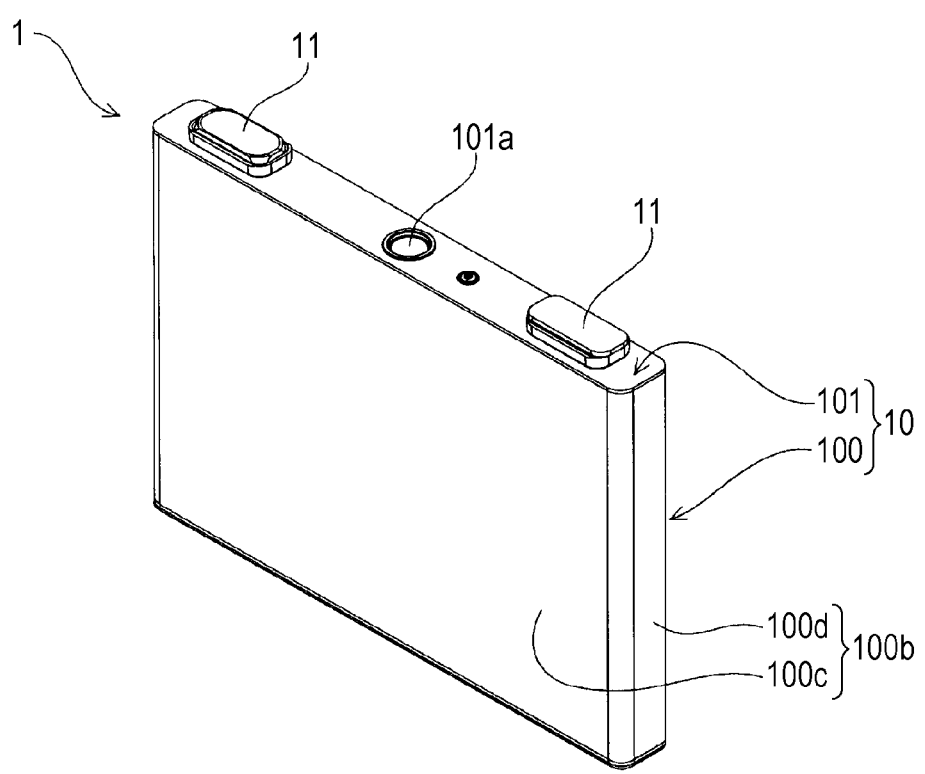
FIG. 4 is a perspective view of an energy storage device in the energy storage apparatus.
Figure 5:
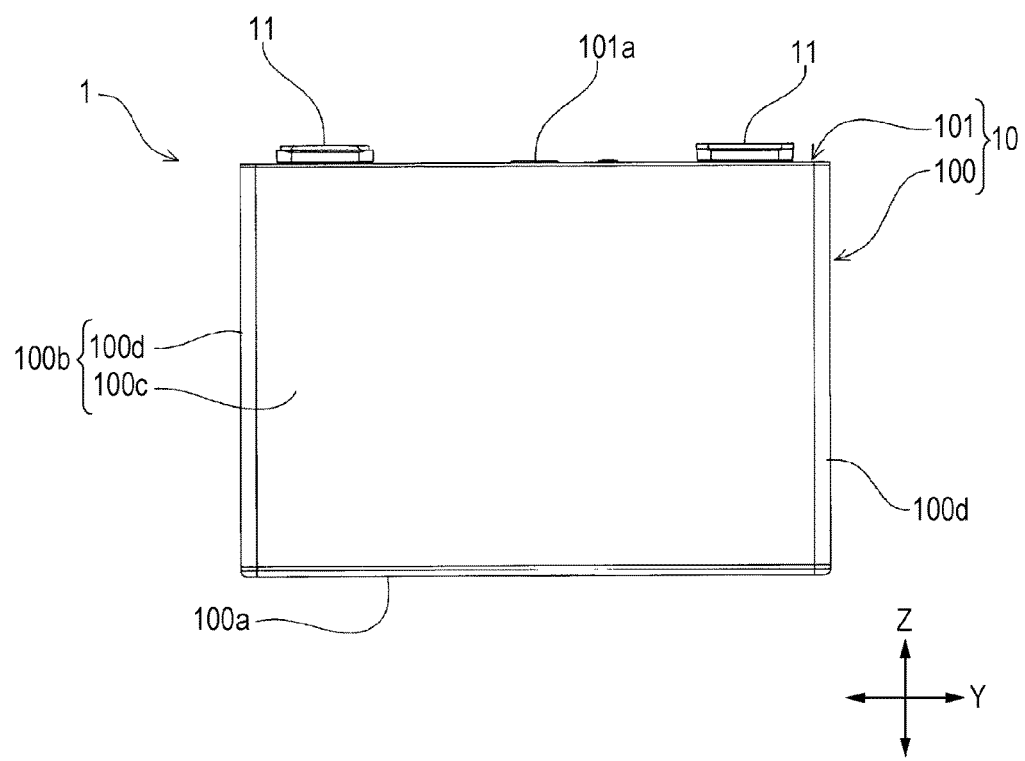
FIG. 5 is a front view of the energy storage device.

As shown in FIG. 4 and FIG. 5, the energy storage device 1 includes: an electrode assembly not shown in the drawings which includes a positive electrode and a negative electrode; a case 10 which houses the electrode assembly; and a pair of external terminals 11 arranged on an outer surface of the case 10.

The case 10 includes: a case body 100 having an opening; and a lid plate 101 which closes the opening of the case body 100, and the pair of external terminals 11 is arranged on an outer surface of the lid plate 101.

The case body 100 includes: a closing portion 100*a* (see FIG. 5); and a cylindrical barrel portion 100*b* which is connected to a periphery of the closing portion 100*a* so as to surround the closing portion 100*a*.

The barrel portion 100*b* includes: a pair of first walls 100*c* which faces each other with a distance therebetween; and a pair of second walls 100*d* which faces each other with the pair of first walls 100*c* interposed therebetween.

The first wall 100*c* and the second wall 100*d* are each formed into a rectangular shape. That is, the respective surfaces of the first wall 100*c* and the second wall 100*d* are formed of a quadrangular flat surface. The first wall 100*c* and the second wall 100*d* are arranged adjacently to each other in a state where respective end edges of the first and second walls 100*c*, 100*d* abut each other. With respect to the first wall 100*c* and the second wall 100*d* which are arranged adjacently to each other, the end edge of the first wall 100*c* and the end edge of the second wall 100*d* are connected to each other over the entire length. Accordingly, the barrel portion 100*b* is formed into a prismatic cylindrical shape. One end of the barrel portion 100*b* is closed by the closing portion 100*a*. On the other hand, the other end of the barrel portion 100*b* of the case body 100 is opened. This opening is closed by the lid plate 101. In the embodiment, a surface area of the first wall 100*c* is set larger than a surface area of the second wall 100*d*. Accordingly, the barrel portion 100*b* has a flat prismatic cylindrical shape.

The energy storage apparatus according to the embodiment includes the plurality of energy storage devices 1. The plurality of energy storage devices 1 are arranged in a row in one direction. In the embodiment, the plurality of the energy storage devices 1 are arranged in a row in a state where the first walls 100*c* of the cases 10 are directed in one direction. The energy storage apparatus includes a bus bar not shown in the drawings which electrically connects the external terminals 11 of every two neighboring energy storage devices 1 to each other.

In the description made hereinafter, for the sake of convenience, the direction (first direction) along which the energy storage devices 1 are arranged in a row is referred to as an X axis direction. Further, in a coordinate system (a rectangular coordinate system) where three axes are orthogonal to each other at right angles, out of two axial directions which are orthogonal to the direction (X axis direction) along which the energy storage devices 1 are arranged in a row, one direction (second direction) is referred to as a Y axis direction, and the remaining one direction (third direction) is referred to as a Z axis direction. In accordance with such a coordinate system, in the drawings, respective three orthogonal axes (coordinate axes) which correspond to the X axis direction, the Y axis direction and the Z axis direction are described complementarily.

The spacers 2 have insulating property. The spacer 2 includes: a base which is arranged adjacently to the energy storage device 1 (to be specific, the case 10, and to be more specific, the first wall 100*c* of the barrel portion 100*b*); and restricting portions which prevent the positional displacement of the energy storage device 1 arranged adjacently to the base.

The spacer 2 is described more specifically. As described above, the energy storage apparatus includes the plurality of energy storage devices 1. As shown in FIG. 2 and FIG. 3, the energy storage apparatus includes two kinds of spacers 2 (2A, 2B). That is, the energy storage apparatus includes a spacer 2A which is arranged between every two energy storage devices 1 (hereinafter referred to as "inner spacer"); and spacers 2B which are arranged adjacently to the energy storage devices 1 arranged at both ends out of the plurality of the energy storage devices 1 (hereinafter referred to as "outer spacers").

Firstly, the inner spacer 2A is described. The inner spacer 2A includes a base 20A arranged adjacently to the energy storage device 1 (the first wall 100*c* of the case body 100); and restricting portions 21A which suppress the positional displacement of the energy storage device 1 arranged adjacently to base 20A with respect to the base 20A. The inner spacer 2A also includes vent cover portions 22A which project from the base 20A and are arranged on the lid plate 101 (a gas release vent 101*a*) of the energy storage device 1.

The base 20A (hereinafter simply referred to as "base 20A") of the inner spacer 2A is sandwiched between two energy storage devices 1. That is, the energy storage device 1 is arranged on both sides of the base 20A in the X axis direction. The base 20A extends in the direction orthogonal to the X axis direction. The base 20A has: a first surface which opposedly faces one energy storage device 1 out of two energy storage devices 1 arranged adjacently to each other; and a second surface which is arranged on a side opposite to the first surface and opposedly faces the other energy storage device 1 out of the two the energy storage devices 1. The base 20A has an approximately rectangular shape as viewed in the X axis direction. The base 20A has substantially the same size as the first wall 100*c* of the energy storage device 1 (a size corresponding to the size of the first wall 100*c* of the energy storage device 1).

In the energy storage apparatus according to the embodiment, a passage which allows a cooling fluid (a fluid for cooling) to pass (flow) therethrough is formed in at least one of a position between the first surface of the base 20A and the energy storage device 1 and a position between the second surface of the base 20A and the energy storage device 1.

The cross section of the base 20A according to the embodiment has a rectangular corrugated shape. To be more specific, the base 20A includes: first contact portions 200A which are brought into contact with only one energy storage device 1 out of two energy storage devices 1 arranged adjacently to each other; second contact portions 200B which are brought into contact with only the other energy storage device 1 out of the two energy storage devices 1 arranged adjacently to each other; and connecting portions 200C which connect the first contact portions 200A and the second contact portions 200B to each other. The first contact portions 200A are elongated in the Y axis direction. The second contact portions 200B are elongated in the Y axis direction.

In the embodiment, the base 20A includes a plurality of first contact portions 200A and a plurality of second contact portions 200B. The first contact portion 200A and the second contact portion 200B are alternately arranged in the Z axis direction. With this configuration, in the energy storage apparatus, the passage is formed by the surface of the first contact portion 200A on a side opposite to the surface which is brought into contact with the energy storage device 1 and the pair of connecting portions 200C which is connected to the first contact portion 200A. Further, in the energy storage apparatus, the passage is formed by the surface of the second contact portion 200B on a side opposite to the surface which is brought into contact with the energy storage device 1 and the pair of connecting portions 200C which is connected to the second contact portion 200B.

The restricting portions 21A suppress (restrict) the positional displacement of the energy storage devices 1 on both sides in the X axis direction in the Y-Z plane (plane including the Y axis and the Z axis) direction with respect to the inner spacer 2A (base 20A). Accordingly, the restricting portions 21A restrict the relative movement between every two energy storage devices 1 arranged adjacently to the inner spacer 2A. To be more specific, the restricting portions 21A extend to both sides in the X axis direction from the base 20. That is, the restricting portions 21A extend from the base 20A toward the energy storage device 1 arranged adjacently to the first surface of the base 20A of the inner spacer 2A, and also extend from the base 20A toward the energy storage device 1 arranged adjacently to the second surface of the base 20A of the inner spacer 2A. The restricting portions 21A are brought into contact with the energy storage devices 1 thus suppressing the positional displacement in the Y-Z plane direction of the energy storage devices 1 with respect to the base 20A.

The energy storage apparatus according to the embodiment includes the plurality of energy storage devices 1 as described above, and the inner spacer 2A is arranged between each pair of neighboring energy storage devices 1. That is, the energy storage apparatus includes a plurality of inner spacers 2A.

Next, the outer spacer 2B is described by reference to FIG. 1 to FIG. 3, FIG. 6 and FIG. 7. The outer spacer 2B includes: a base 20B arranged adjacent to the energy storage device 1; and restricting portions 21B provided for suppressing the positional displacement of the energy storage device 1 arranged adjacently to the base 20B with respect to the base 20B. The outer spacer 2B according to this embodiment includes seal portions 25B which project toward the energy storage device 1 from the base 20B. The outer spacer 2B also includes protrusions 26B which project toward an end plate 30 from the base 20B.

The base 20B (simply referred to as "base 20B" hereinafter) of the outer spacer 2B forms passages 205B through which a cooling fluid passes is formed between the energy storage device 1 and the base 20B. The base 20B extends along the energy storage device 1 (to be more specific, the first wall 100c of the case body 100). The base 20B has a first surface which faces the energy storage device 1 (to be more specific, the first wall 100c of the case body 100), and a second surface on a side opposite to the first surface.

The outer spacer 2B according to the embodiment is configured such that the base 20B and the end plate 30 described later of the holder 3 oppositely face each other. That is, the outer spacer 2B of the embodiment is arranged between the energy storage device 1 and the end plate 30. The outer spacer 2B has a fitting portion 22B which engages with the end plate 30 by fitting engagement at a position on the base 20B which faces the end plate 30. That is, the outer spacer 2B has the fitting portion 22B which is provided for alignment of the end plate 30 with respect to the base 20B and is formed on the second surface of the base 20B. Further, the outer spacer 2B includes shaft portions 23B which are provided for alignment of the end plate 30 with respect to the base 20B and project from the second surface of the base 20B.

The outer spacer 2B has first projecting portions 24B which project toward the end plate 30 from the second surface of the base 20B and are brought into contact with the end plate 30. The first projecting portions 24B are referred to as outer contact portions 24B hereinafter. The outer contact portions 24B project toward the end plate 30 from the base 20B of the outer spacer 2B and are brought into contact with the end plate 30. Accordingly, in the energy storage apparatus, gaps are formed between the outer spacer 2B and the end plate 30. Further, the outer spacer 2B of the embodiment includes second projecting portions 201B which project toward the energy storage device 1 from the first surface of the base 20B and are brought into contact with the energy storage device 1. Hereinafter, the second projecting portions 201B are referred to as inner contact portions 201B.

The base 20B of the outer spacer 2B extends in the Y-Z plane direction. That is, the base 20B is formed in a plate shape. The base 20B has an approximately rectangular shape as viewed in the X axis direction. Further, the base 20B has a size substantially equal to (corresponding to) the size of the first wall 100c of the energy storage device 1.

The passages 205B which allow a cooling fluid to pass therethrough are formed between the first surface of the base 20B and the energy storage device 1. To describe more specifically, the base 20B includes the inner contact portions 201B which extend toward the case 10 of the energy storage device 1 (to be more specific, the first wall 100c of the case body 100) from the first surface of the base 20B.

The inner contact portion 201B extends in the Y axis direction. That is, the inner contact portion 201B has a projecting shape which projects in the X axis direction and extends in the Y axis direction from the base 20B. The base 20B according to the embodiment includes a plurality of inner contact portions 201B. The plurality of inner contact portions 201B are arranged at intervals in the Z axis direction (the direction orthogonal to the longitudinal direction of the inner contact portion 201B). With this configuration, a plurality of passages 205B are formed between the base 20B of the outer spacer 2B and the energy storage device 1.

The seal portion 25B projects from the base 20B and is brought into contact with the energy storage device 1 arranged adjacently to the base 20B thus preventing leakage of a cooling fluid to the outside (the outside of the energy storage apparatus) from the passage 205B. The seal portion 25B is provided to both end portions of the base 20B in the Z axis direction. That is, the outer spacer 2B has two seal portions 25B. In this embodiment, the seal portion 25B is arranged outside the outermost inner contact portion 201B in the Z axis direction. The seal portion 25B extends in the Y axis direction. That is, the seal portion 25B has a projecting shape which projects from the base 20B in the X axis direction and extends in the Y axis direction. The seal portion 25B of this embodiment extends along the flow direction (Y axis direction in the example of this embodiment) of a cooling fluid in the passage 205B formed between the base 20B and the energy storage device 1.

The seal portion 25B is arranged in a spaced apart manner from the inner contact portion 201B in the Z axis direction. The space surrounded by the inner contact portion 201B, the seal portion 25B, the base 20B and the energy storage device 1 (to be more specific, the first wall 100c) may be also used as the passage 205B. When the surrounded space is used as the passage 205B, the seal portion 25B is positioned at an end portion of the passage 205B. On the other hand, when the surrounded space is not used as the passage 205B, the seal portion 25B is positioned outside the passage 205B in the Z axis direction.

The seal portion 25B has a property that the seal portion 25B is bent when brought into contact with the energy storage device 1. In addition, a projecting length of the seal portion 25B from the base 20B before the seal portion 25B is brought into contact with the energy storage device 1 is larger (greater) than a projecting length of the inner contact portion 201B. Accordingly, by bringing the inner contact portion 201B and the energy storage device 1 into contact with each other, the seal portion 25B is brought into close contact with the energy storage device 1 thus preventing leakage of a cooling fluid. In this embodiment, the seal portion 25B is formed into a tapered shape gradually narrowed toward a distal end thereof. Accordingly, the seal portion 25B is more likely to be deflected when the seal portion 25B is brought into contact with the energy storage device 1.

The protrusion 26B projects from the position corresponding to the seal portion 25B on the base 20B (the position where the protrusion 26B overlaps with the seal portion 25B in the X axis direction) in the direction opposite to the seal portion 25B. In this embodiment, the protrusion 26B projects toward the end plate 30 such that a distal end of the protrusion 26B in the projecting direction is in contact (is brought into contact) with the end plate 30. The protrusion 26B extends in the Y axis direction. That is, the protrusion 26B has a protruding shape which protrudes from the base 20B in the X axis direction and extends in the Y axis direction at a position where the protrusion 26B overlaps with the seal portion 25B in the X axis direction. With such a configuration, in this embodiment, in the same manner as the seal portion 25B, the protrusion 26B extends along the flow direction of a cooling fluid in the passage 205B. Since the seal portion 25B and the protrusion 26B overlap with each other in the X axis direction in this manner, a force applied to press the end plate 30 (force in the direction toward the energy storage device 1 in the X axis direction: pressing force) is efficiently transmitted to the seal portion 25B by the protrusion 26B.

The restricting portions 21B restrict the positional displacement (relative movement) of the energy storage device 1 arranged adjacently to the first surface of the outer spacer 2B with respect to the base 20B. The restricting portions 21B extend from the base 20B toward the energy storage device 1 arranged adjacently to the first surface of the base 20B. Due to contacting of the restricting portion 21B with the energy storage device 1, the positional displacement of the energy storage device 1 with respect to the base 20B in the Y-Z plane direction can be suppressed (restricted).

The energy storage apparatus of this embodiment includes a pair of outer spacers 2B having the above-mentioned configuration. The outer spacers 2B are arranged adjacently to the outermost energy storage devices 1 out of the plurality of energy storage devices 1. That is, the pair of outer spacers 2B is provided so as to sandwich in the X axis direction the plurality of arranged energy storage devices 1.

As shown in FIG. 1 and FIG. 2, the holder 3 includes: a pair of end plates 30 which is arranged at positions adjacently to the respective outer spacers 2B; and frames 31 which connect the pair of end plates 30.

The pair of end plates 30 extends along the respective energy storage devices 1 (to be more specific, the first walls 100c). The end plate 30 includes: a first surface which opposedly faces the outer spacer 2B; and a second surface disposed on a side opposite to the first surface. In the embodiment, as shown in FIG. 6 to FIG. 9, the end plate 30 includes a plurality of (four in the embodiment) through holes 300b formed in respective corner portions thereof. Each end plate 30 includes a flat-plate-shaped body 301 and a pressure contact portion 300 which projects toward the energy storage device 1 from the body 301. The pressure contact portion 300 is brought into contact with the outer contact portions 24B which extend from the base 20B of the outer spacer 2B. The pressure contact portion 300 has insertion holes 300a formed at positions corresponding to the shaft portions 23B of the outer spacer 2B. In the embodiment, the end plate 30 includes pressing portions 302 which press the seal portions 25B toward the energy storage device 1 via the base 20B. The end plate 30 also includes support portions 303 which support the pressing portions 302.

The support portion 303 extends toward the outer spacer 2B (to be more specific, the base 20B) from the periphery of the body 301, and has the pressing portion 302 on a distal end (an edge on an outer spacer 2B side) thereof. In this embodiment, the support portion 303 is formed on both ends of the body 301 in the Z axis direction. The support portion 303 is a member which extends in the X axis direction as well as in the Y axis direction. To be more specific, the support portion 303 is a rectangular (strip-shaped) portion elongated in the Y axis direction. The support portions 303 are provided at the positions corresponding to the seal portions 25B, that is, at the positions where the support portions 303 overlap in the X axis direction with respective portions of the base 20B at both ends in the Z axis direction.

The pressing portion 302 extends along the base 20B, and includes an edge of the end plate 30. To be more specific, the pressing portion 302 extends toward a periphery of the base 20B (a peripheral side of the base 20 in the Y-Z plane direction in the example of this embodiment) from the distal end (an edge on a base 20B side) of the support portion 303. In this embodiment, the pressing portion 302 and the support portion 303 are integrally formed with each other by bending a rectangular plate-like portion. That is, the support portion 303 and the pressing portion 302 form an approximately L shape as viewed in the Y axis direction (see FIG. 6). In this embodiment, the pressing portion 302 is a member which extends in the Y axis direction as well as in the Z axis direction. To be more specific, the pressing portion 302 is a rectangular (strip-shaped) portion elongated in the Y axis direction. The pressing portion 302 is arranged at a position which overlaps with the protrusion 26B (seal portion 25B) in the X axis direction, and is brought into contact with a distal end portion of the protrusion 26B in the projecting direction. The width of the pressing portion 302 in the Z axis direction is larger than the width of a contact portion (a portion brought into a contact state) of the protrusion 26B of the base 20B with the pressing portion 302. That is, a contact area between the protrusion 26B and the pressing portion 302 is smaller than the area of an opposedly facing surface 302B of the pressing portion 302, the surface 302B opposedly faces the base 20B (a surface with which the protrusion 26B is brought into contact) and extends along the base 20B (in the Y-Z plane direction in the example of this embodiment). In this embodiment, the oppositely facing surface 302B extends in the Y-Z plane direction. Further, in this embodiment, the oppositely facing surface 302B is at substantially the same position in the X axis direction as the position of a distal end of the pressure contact portion 300 in the bulging direction. The position of the oppositely facing surface 302B and the position of the distal end of the pressure contact portion 300 may not be at the same position in the X axis direction.

Figure 6:
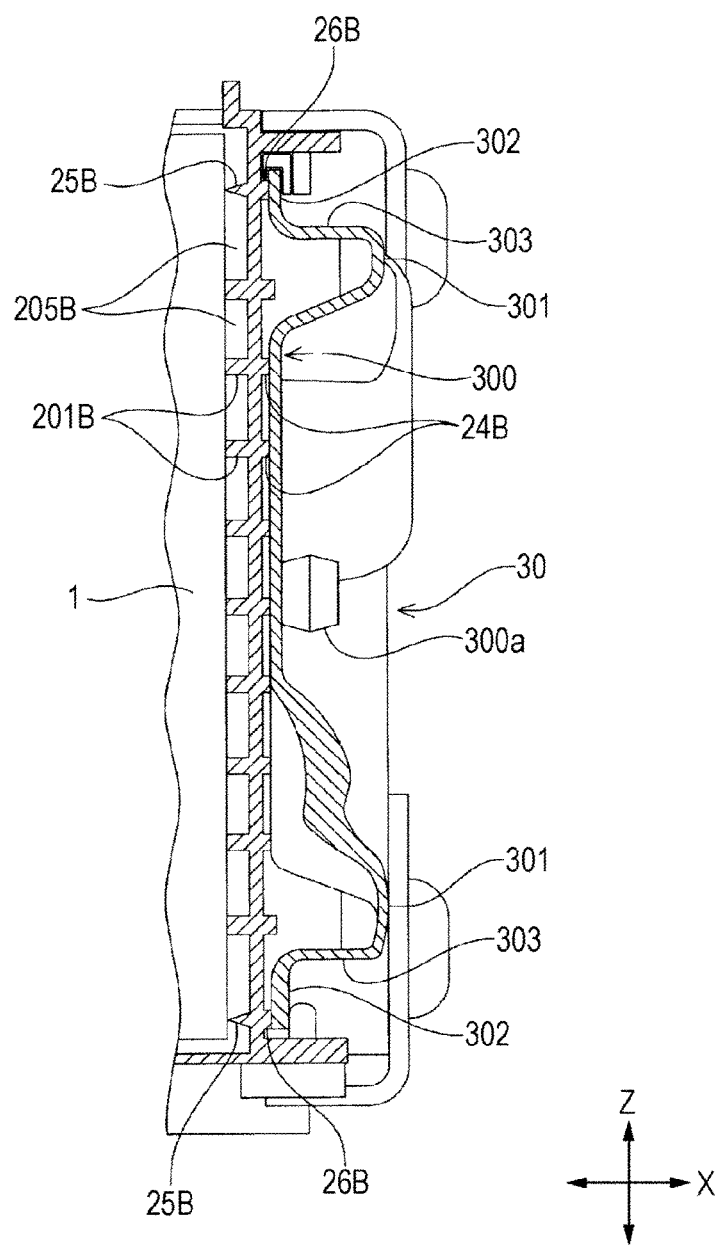
FIG. 6 is a cross-sectional view of a portion of the energy storage apparatus.
Figure 7:
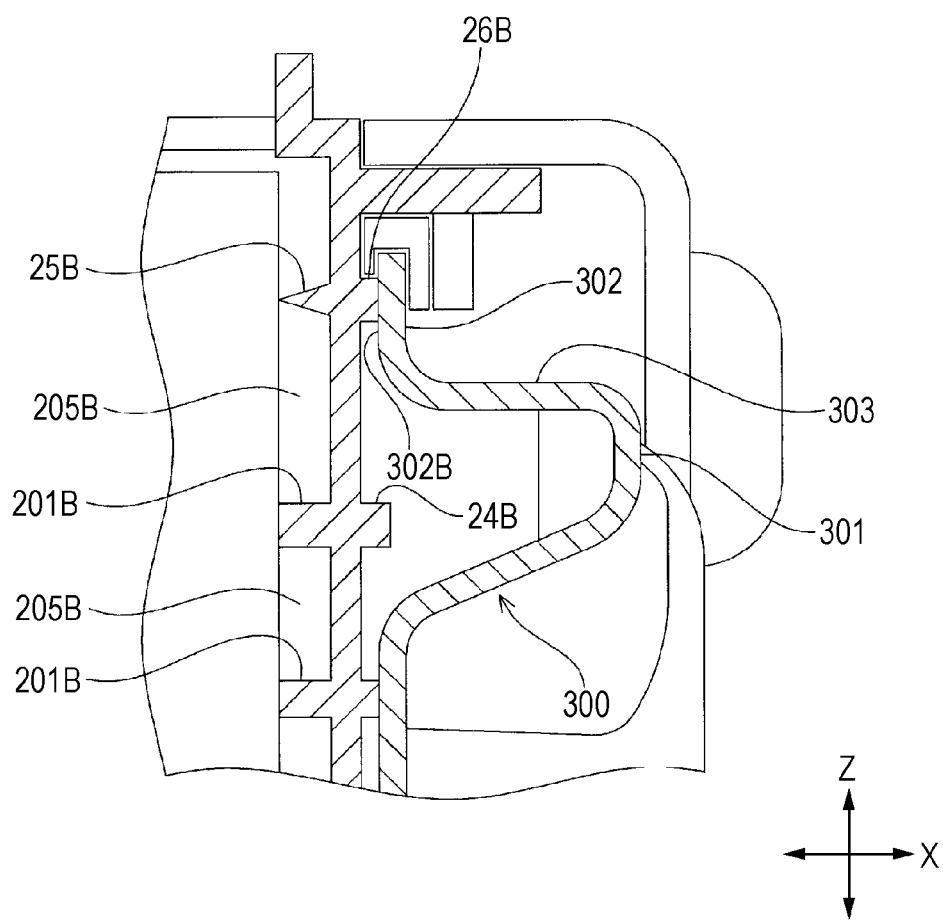
FIG. 7 is a cross-sectional view of a seal portion of an outer spacer and a pressing portion of an end plate in the energy storage apparatus and the periphery of the seal portion and the pressing portion.
Figure 8:
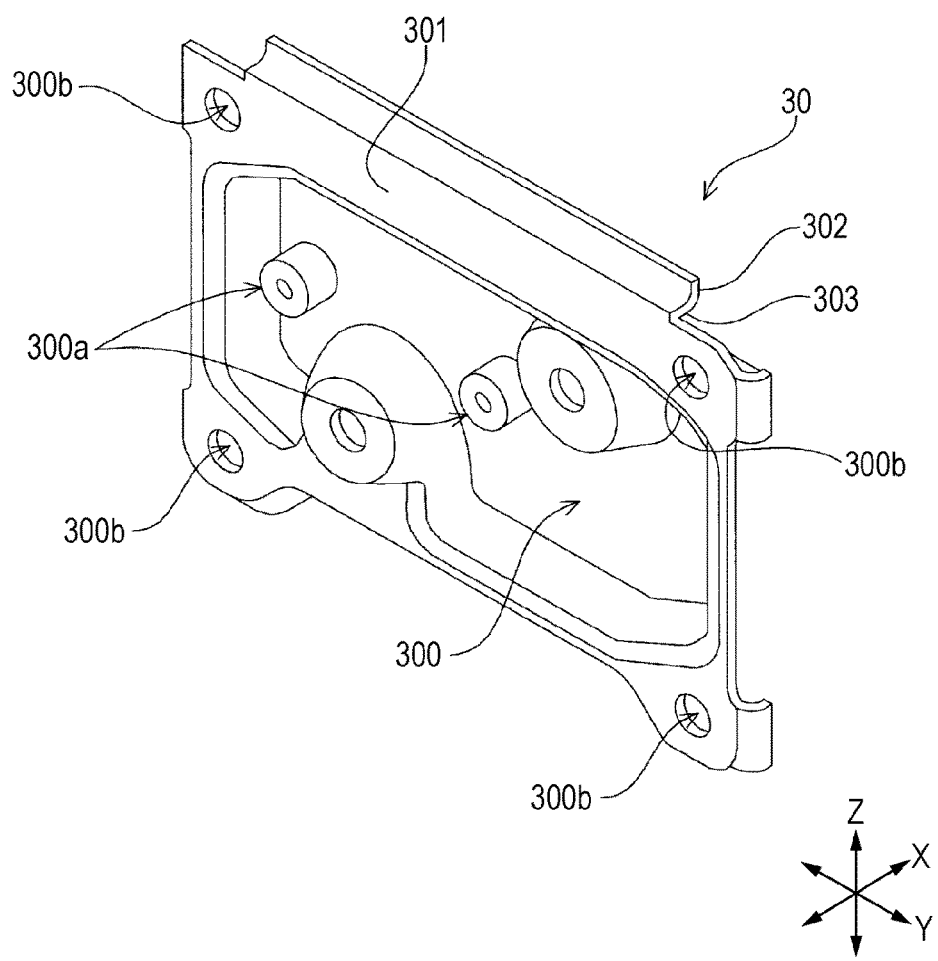
FIG. 8 is a perspective view of the end plate.
Figure 9:
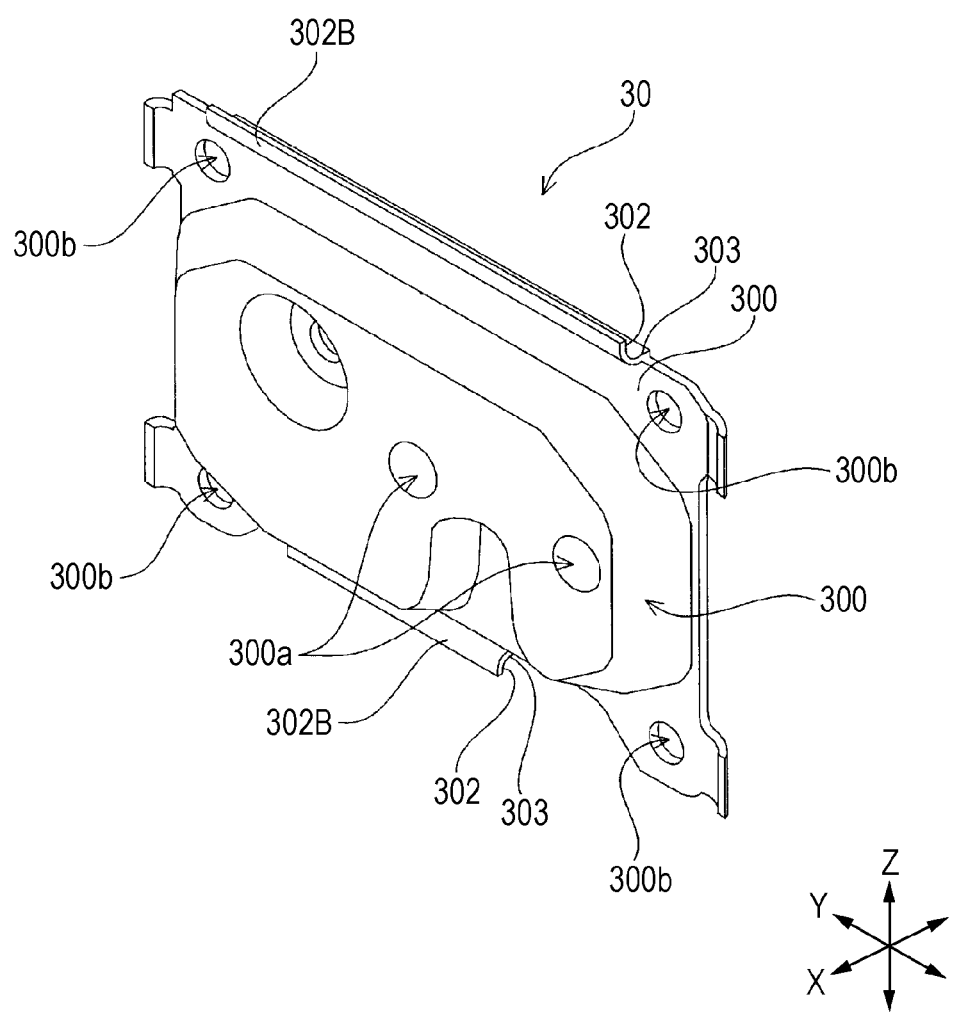
FIG. 9 is a perspective view of the end plate.

As described above, in the energy storage apparatus, with respect to a cross-sectional shape of the portion adjacent to the pressing portion 302, that is, a cross-sectional shape of the portion ranging from the pressure contact portion 300 to the body 301 and the support portion 303, as shown in FIG. 6, a recessed portion is formed where an opening is formed on a first surface side of the outer spacer 2B and the recessed portion is indented in the direction toward a second surface from the first surface. In this manner, by forming the recessed portion at the portion adjacent to the pressing portion 302, a force applied by the pressing portion 302 to press the base 20B is minimally transferred to a portion other than a portion corresponding to the seal portion 25B in the base 20B.

Further, as described previously, by adopting the constitution where the pressing portion 302 and the portion which is brought into contact with the base 20B in the pressure contact portion 300 are not directly connected with each other (that is, independent from each other), it is possible to make a force applied by the pressing portion 302 to press the base 20B and a force applied by the pressure contact portion 300 to press the base 20B different from each other. That is, by adjusting the length of the support portion 303 in the X axis direction, the magnitude of the force applied by the pressing portion 302 to press the seal portion 25B via the base 20B and the magnitude of the force applied by the pressure contact portion 300 to press the energy storage device 1 via the base 20B can be made different from each other.

As shown in FIG. 1 and FIG. 2, the frames 31 include a plurality of connecting portions extending between the pair of end plates 30. In this embodiment, the frames 31 include: a pair of first connecting portions 310 arranged at positions corresponding to the lid plates 101 of the energy storage devices 1; and a pair of second connecting portions 311 arranged at positions corresponding to the closing portions 100a of the energy storage devices 1. The frames 31 also include a fixing portion 313 which is connected to the end plate 30.

Each of the pair of first connecting portions 310 includes a first end in the longitudinal direction and a second end on a side opposite to the first end. On the other hand, each of the pair of second connecting portions 311 includes a first end in the longitudinal direction and a second end on a side opposite to the first end.

The fixing portion 313 includes: a pair of first fixing portions 313a formed on the respective first and second ends of each of the pair of first connecting portions 310; and a pair of second fixing portions 313b formed on the respective first and second ends of each of the pair of second connecting portions 311.

One first fixing portion 313a formed on the first end of the first connecting portion 310 opposedly faces a peripheral portion around the through hole 300b of one end plate 30 in the X axis direction. The other first fixing portion 313a formed on the second end of the first connecting portion 310 opposedly faces a peripheral portion around the through hole 300b of the other end plate 30 in the X axis direction. A first hole 313c is formed in each of the pair of first fixing portions 313a at a position corresponding to the through hole 300b. The first connecting portion 310 is connected to the end plates 30 by threadedly mounting nuts on bolts which pass through the through holes 300b formed in the end plates 30 and the first holes 313c formed in the first fixing portions 313a.

One second fixing portion 313b formed on the first end of the second connecting portion 311 opposedly faces a peripheral portion around the through hole 300b of one end plate 30 in the X axis direction. The other second fixing portion 313b formed on the second end of the second connecting portion 311 opposedly faces a peripheral portion around the through hole 300b of the other end plate 30 in the X axis direction. A second hole 313d is formed in each of the pair of second fixing portions 313b at a position corresponding to the through hole 300b. The second connecting portion 311 is connected to the end plates 30 by threadedly mounting nuts on bolts which pass through the through holes 300b formed in the end plates 30 and the second holes 313d formed in the second fixing portions 313b.

The insulator 4 is formed using a material having an insulating property. The insulator 4 includes: a pair of first insulating portions 40 arranged between the pair of respective first connecting portions 310 and the energy storage devices 1; and a pair of second insulating portions 41 arranged between the pair of respective second connecting portions 311 and the energy storage devices 1.

According to the energy storage apparatus described above, the seal portion 25B is pressed to the energy storage device 1 by partially pressing the outer spacer 2B by the pressing portion 302 (that is, by pressing only a portion of the outer spacer 2B corresponding to the seal portion 25B) and hence, even when the deformation of the outer spacer 2B, a change in a posture of the outer spacer 2B with respect to the end plate 30 or the like occurs due to the deformation or the like of the energy storage device 1, compared to an end plate which presses the outer spacer 2B to the energy storage device 1 with an approximately uniform force at respective positions in the direction along the energy storage device 1, a sufficient pressing force (a force in the X axis direction) is applied to the seal portion 25B. As a result, in the energy storage apparatus of this embodiment, a cooling fluid minimally leaks to the outside of the energy storage apparatus from the passage 205B.

Further, the pressing portion 302 is formed on a peripheral portion (a portion including the edge) of the end plate 30 and hence, the pressing portion 302 and the seal portion 25B of the outer spacer 2B can be provided at a peripheral portion on the opposedly facing surface (surface of the first wall 100c) of the energy storage device 1 which faces opposedly the outer spacer 2B. Accordingly, it is possible to suppress the influence exerted on the pressing portion 302 and the seal portion 25B due to bulging of the center portion of the energy storage device 1 (above-mentioned opposedly facing surface) generated by the charge-discharge repetition. As a result, even when such bulging occurs, the seal portion 25B is brought into sufficiently close contact with the energy storage device 1 due to a pressing force from the pressing portion 302 and hence, a cooling fluid minimally leaks from the passage 205B.

In the energy storage apparatus of this embodiment, the protrusion 26B projects toward the pressing portion 302 from the position corresponding to the seal portion 25B on the base 20B. With such a configuration, a pressing force generated by the pressing portion 302 is applied to the protrusion 26B formed at the position corresponding to the seal portion 25B on the base 20B and hence, the pressing force is effectively transmitted to the seal portion 25B. As a result, the seal portion 25B and the energy storage device 1 are brought into sufficiently close contact with each other thus making a cooling fluid minimally leak from the passage 205B.

In the energy storage apparatus of this embodiment, a contact area of the protrusion 26B with the pressing portion 302 is smaller than the area of the opposedly facing surface 302B of the pressing portion 302 and hence, the contact area between the outer spacer 2B and the pressing portion 302 can be reduced. Accordingly, it is possible to more effectively suppress the influence of the deformation or the like of the energy storage device 1 exerted on the seal portion 25B and the pressing portion 302. As a result, even when the energy storage device 1 is deformed or the like, it is possible to maintain the sufficient close contact between the seal portion 25B and the energy storage device 1 and hence, a cooling fluid minimally leaks from the passage 205B.

In the energy storage apparatus of this embodiment, the seal portion 25B and the pressing portion 302 extend in the flow direction (the Y axis direction in this embodiment) of a cooling fluid in the passage 205B. Accordingly, in the energy storage apparatus, leakage of a cooling fluid toward the outside can be prevented over the whole passage 205B in the flow direction.

In the energy storage apparatus of this embodiment, the pressing portion 302 extends toward a periphery of the base 20B from a distal end of the support portion 303 extending toward the outer spacer 2B from the periphery of the body 301. Accordingly, even when the seal portion 25B is provided on the peripheral portion of the base 20B, the seal portion 25B can be pressed by the pressing portion 302 while preventing the end plate 30 from extending beyond the periphery of the outer spacer 2B. The specific constitutions are explained below.

Figure 10:
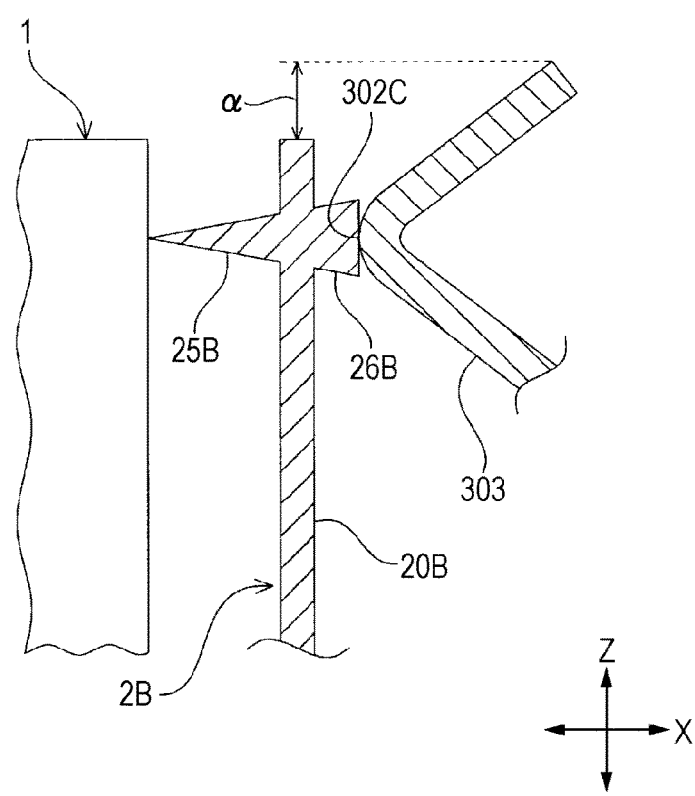
FIG. 10 is a cross-sectional view explaining an advantageous effect brought about by the pressing portion of the outer spacer.
Figure 11:
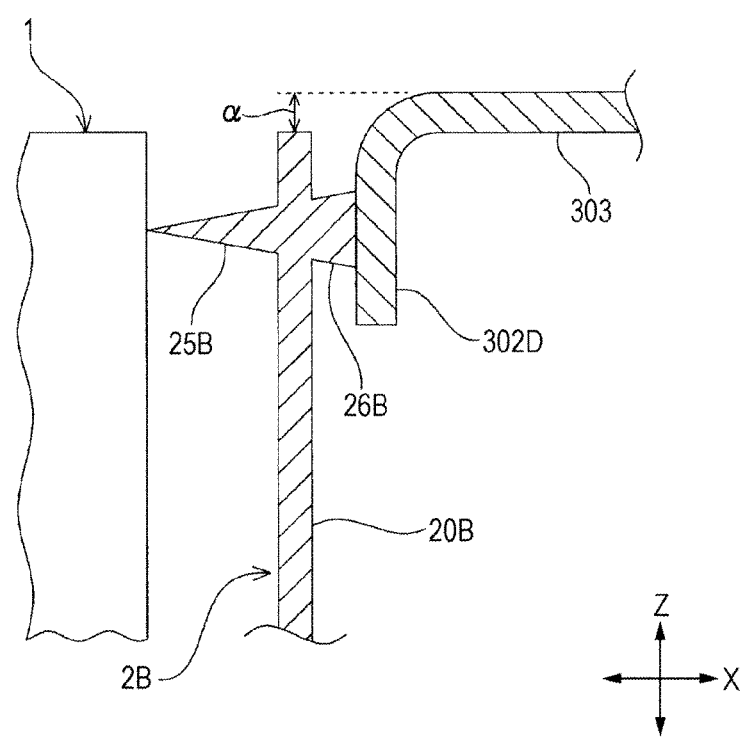
FIG. 11 is a cross-sectional view explaining an advantageous effect brought about by the pressing portion of the outer spacer.

The support portion 303 and the pressing portion 302 are formed by bending a metal-made plate-like member using a press or the like. The plate like member has a thickness which ensures a predetermined strength and hence, a bent portion (a boundary portion between the support portion 303 and the pressing portion 302) is not at a right angle but is in a curved state. Accordingly, as shown in FIG. 10 and FIG. 11, in the case where a pressing portion 302C is formed so as to have a V-shaped cross section or a U-shaped cross section or a pressing portion 302D or the like is formed such that the pressing portion 302D extends toward the inside of the base 20B in the Y-Z plane direction from a distal end of the support portion 303, when the seal portion 25B is formed on a peripheral portion (an area in the vicinity of the periphery) of a base 20B, the end plate 30 projects from the periphery of the base 20B (see α in FIG. 10 and FIG. 11).

On the other hand, with the use of the end plates 30 of this embodiment, without increasing the size of the energy storage apparatus, the energy storage device 1 and the seal portion 25B can be brought into firmly close contact with each other on peripheral portions of the opposedly facing surface (surface of the first wall 100c) of the energy storage device 1 with the outer spacer 2B. Accordingly, an arrangement region of the passage 205B neighboring the opposedly facing surface can be increased while preventing leakage of a cooling fluid to the outside from the passage 205B. As a result, cooling efficiency of the energy storage device 1 can be enhanced without increasing the size of the energy storage apparatus.

The energy storage apparatus according to the present invention is not limited to the above-mentioned embodiment, and various modifications are conceivable without departing from the gist of the present invention.

In the energy storage apparatus of the above-mentioned embodiment, the pressing portion 302 continuously extends in the flow direction (the Y axis direction in the example of the above-mentioned embodiment) of a cooling fluid. However, the energy storage apparatus is not limited to such a configuration. Provided that the pressing portion 302 can press the seal portion 25B toward the energy storage device 1 such that the seal portion 25B and the energy storage device 1 (to be more specific, the first wall 100c) are bought into close contact with each other so as to prevent leakage of a cooling fluid to the outside of the energy storage apparatus, the pressing portion 302 may extend in the flow direction discontinuously.

The specific shape of the opposedly facing surface 302B of the pressing portion 302 of the end plate 30 is not limited. Although the opposedly facing surface 302B of the pressing portion 302 of the above-mentioned embodiment is a plane which extends in the Y-Z direction, the opposedly facing surface 302B may be a curved surface or the like, for example. The opposedly facing surface 302B may be formed into any shape by which the protrusion 26B or a portion on the base 20B corresponding to the seal portion 25B (a portion on the base 20B which overlaps with the seal portion 25B in the X axis direction) can be pressed toward the energy storage device 1.

The energy storage apparatus of the above-mentioned embodiment includes the protrusion 26B which projects in the direction opposite to the seal portion 25B from the position on the base 20B which overlaps with the seal portion 25B in the X axis direction. However, the present invention is not limited to such a configuration. For example, the base 20B may not include the protrusion 26B. In this case, it is preferable that the end plate 30 include a protrusion which is directed toward the base 20B form the pressing portion 302. Also with such a configuration, it is possible to apply a sufficient pressing force to the seal portion 25B. It is more preferable that the protrusion be arranged at a position which overlaps with the seal portion 25B in the X axis direction. With such a configuration, it is possible to apply a pressing force to the seal portion 25B more effectively.

The width of the protrusion 26B of the above-mentioned embodiment in the Z axis direction is smaller than the width of the opposedly facing surface 302B of the pressing portion 302 in the Z axis direction. That is, a contact area of the protrusion 26B with the pressing portion 302 (opposedly facing surface 302B) is smaller than the area of the opposedly facing surface 302B. However, the present invention is not limited to such a configuration. The width of the protrusion 26B in the Z axis direction may be larger than the width of the opposedly facing surface 302B of the pressing portion 302 in the Z axis direction. In this case, the contact area of the protrusion 26B with the pressing portion 302 (the opposedly facing surface 302B) is equal to the area of the opposedly facing surface 302B of the pressing portion 302. Also with such a configuration, a pressing force is applied to the protrusion 26B formed on the base 20B at the position corresponding to the seal portion 25B. Accordingly, also with such a configuration, a pressing force is effectively transmitted to the seal portion 25B and hence a close contact state between the seal portion 25B and the energy storage device 1 can be sufficiently ensured whereby a cooling fluid minimally leaks from the passage 205B. As described above, by setting the contact area of the protrusion 26B with the pressing portion 302 (opposedly facing surface 302B) smaller than the area of the opposedly facing surface 302B, the contact area of the outer spacer 2B and the pressing portion 302 can be suppressed and hence, the influence of the deformation or the like of the energy storage device 1 exerted on the seal portion 25B and the pressing portion 302 can be suppressed more efficiently. Accordingly, it is more preferable to adopt such a configuration.

In the energy storage apparatus of the above-mentioned embodiment, the base 20A of the inner spacer 2A has an approximately rectangular shape, and has a size substantially equal to the size of the first wall 100c of the energy storage device 1. However, provided that the base 20A of the inner spacer 2A can allow the respective postures of every two energy storage devices 1 arranged adjacently to the base 20A to be matched, the base 20A is not limited to an approximately rectangular shape. Further, the size of the base 20A is also not limited to the size substantially equal to the size of the first wall 100c of the energy storage device 1.

In the energy storage apparatus of the above-mentioned embodiment, the base 20A of the inner spacer 2A forms a passage between the base 20A and the energy storage device 1 by forming the base 20A into a rectangular corrugated shape. However, provided that the base 20A of the inner spacer 2A allows a fluid to pass through between the first surface and the energy storage device 1 (between the second surface and the energy storage device 1), the shape of the base 20A is not limited to a rectangular corrugated shape. Further, in the case where it is unnecessary to form a passage between the base 20A of the inner spacer 2A and the energy storage device 1, the base 20A of the inner spacer 2A may be formed into a flat plate shape.

With respect to the end plate of the above-mentioned embodiment, in a state before the end plate is incorporated into the energy storage apparatus (that is, in a state where the end plate is provided as a single element), the pressing portion 302 and a portion of the pressure contact portion 300 which is to be brought into contact with the base 20B are at the same position in the X axis direction. However, the present invention is not limited to such a configuration. For example, in the state before the end plate is incorporated into the energy storage apparatus, the end plate may be configured such that the pressing portion 302 is positioned closer to the energy storage device 1 than the contact portion of the pressure contact portion 300 (the configuration where the pressing portion 302 projects more in the X axis direction than the pressure contact portion 300). With such a configuration, by connecting the pair of end plates 30 by the first connecting portions 310 and the second connecting portions 311 such that the pressure contact portions 300 of the respective end plates 30 are brought into contact with the outer spacers 2B, a sufficient pressing force is applied to the seal portion 25B from the pressing portion 302.

Conventionally, there has been known a power source apparatus for a vehicle provided with a battery cell (see JP-A-2010-170870). To be more specific, the power source apparatus includes: a plurality of battery cells arranged in a row; and a pair of endplates which sandwiches the plurality of the battery cells therebetween. Since the pair of endplates is constituted so as to fix the energy storage apparatus to a vehicle or the like and has ribs or the like for securing the strength of the endplates, unevenness (that is, recessed portion and projected portion) is formed on a surface of the endplates.

When the recessed portions are formed on the surface of the endplate, during the use of the power source apparatus or the like, there may be a case where water produced on the surface of the endplate by condensation or the like stagnates in the recessed portions.

In view of the above, there has been a demand for an energy storage apparatus where water minimally stagnates in a recessed portion formed on an end plate.

(1) An energy storage apparatus includes:

an energy storage device; and an end plate arranged adjacently to the energy storage device, wherein the end plate has a recessed portion which opens in a horizontal direction or in an approximately horizontal direction, the recessed portion on at least one of a first surface of the end plate which opposedly faces the energy storage device and a second surface of the end plate on a side opposite to the first surface, and the recessed portion has an outwardly and downwardly inclined surface on a lower edge portion thereof.

With such a configuration, water which condensates in the recessed portion and water which condensates in other portions (portions excluding the recessed portion) of the end plate and enters the recessed portion are discharged to the outside by way of the lower edge portion of the recessed portion along the inclined surface. Accordingly, water minimally stagnates in the recessed portion.

(2) In the energy storage apparatus described in the above-mentioned (1), it is preferable that the recessed portion be formed on the second surface of the end plate, the end plate have a contact portion which is brought into contact with a member which fixes the energy storage apparatus, and the contact portion have a shape so as to form a gap between the fixing member and an opening edge of the recessed portion of the end plate in a state where the fixing member is mounted.

With such a configuration, even when the fixing member is mounted on the energy storage apparatus so that the contact portion is brought into contact with the fixing member, a gap is formed between the opening edge of the recessed portion and the fixing member and hence, water (water produced by condensation or the like) in the recessed portion is not confined in the recessed portion and is discharged to the outside of the recessed portion through the gap.

(3) In the energy storage apparatus described in the above-mentioned (2), the contact portion may project more than the opening edge of the recessed portion.

With such a configuration, with the use of the simple constitution where a portion projecting more than the opening edge is formed, when the fixing member is mounted on the energy storage apparatus, a gap corresponding to a projection amount of the contact portion from the opening edge can be formed between the opening edge of the recessed portion and the fixing member. Accordingly, water (water produced by condensation or the like) in the recessed portion is not confined in the recessed portion and is discharged to the outside of the recessed portion through the gap.

(4) In the energy storage apparatus described in the above-mentioned (2) or (3), the contact portion may project from the inside of the recessed portion.

By making the contact portion project from the inside of the recessed portion, it is unnecessary to ensure a space for forming the contact portion outside the recessed portion in the end plate and hence, the end plate can be miniaturized.

(5) In the energy storage apparatus described in any one of the above-mentioned (1) to (4), the recessed portion may have a raised surface which extends along the energy storage device, and the inclined surface may extend from a lower edge of the raised surface.

With such a configuration, water produced by condensation or the like in the recessed portion easily flows to a lower edge of the raised surface, that is, a lower edge portion of the recessed portion along the raised surface. Accordingly, water produced due to condensation or the like in the recessed portion can be discharged with more certainty.

(6) An energy storage apparatus includes: an energy storage device; and an end plate arranged adjacently to the energy storage device, wherein the end plate has a recessed portion which opens in at least one of a first surface of the end plate which opposedly faces the energy storage device and a second surface of the end plate on a side opposite to the first surface, and at least a partial region of an opening edge portion of the recessed portion in the circumferential direction may be formed of an inclined surface inclined in a direction that the opening is increased as the inclined surface extends in the opening direction.

With such a configuration, when the energy storage apparatus is arranged in a posture where the opening direction of the recessed portion is equal to a horizontal direction or an approximately horizontal direction and the region formed of the inclined surface is at a lower portion, water which condensates in the recessed portion and water which condensates in other portions (portions excluding the recessed portion) of the end plate and enters the recessed portion are discharged from the recessed portion along the inclined surface at the lower portion of the recessed portion whereby water minimally stagnates in the recessed portion.

(7) An energy storage apparatus includes: an energy storage device; and an end plate arranged adjacently to the energy storage device, wherein the end plate has an inner peripheral surface which defines a through hole penetrating the end plate from a first surface which opposedly faces the energy storage device to a second surface on a side opposite to the first surface, and at least a partial region of the inner peripheral surface in a circumferential direction may have an inclined surface which is inclined in a direction that the through hole is increased as the inclined surface extends from one opening toward the other opening of the through hole.

With such a configuration, when the energy storage apparatus is arranged in a posture where the penetration direction is equal to a horizontal direction or an approximately horizontal direction, and the region formed of the inclined surface on the inner peripheral surface is at a lower portion, water which condensates on the inner peripheral surface is discharged through the through hole along the inclined surface at the lower portion of the inner peripheral surface whereby water minimally stagnates in the through hole (on inner peripheral surface).

Figure 12:
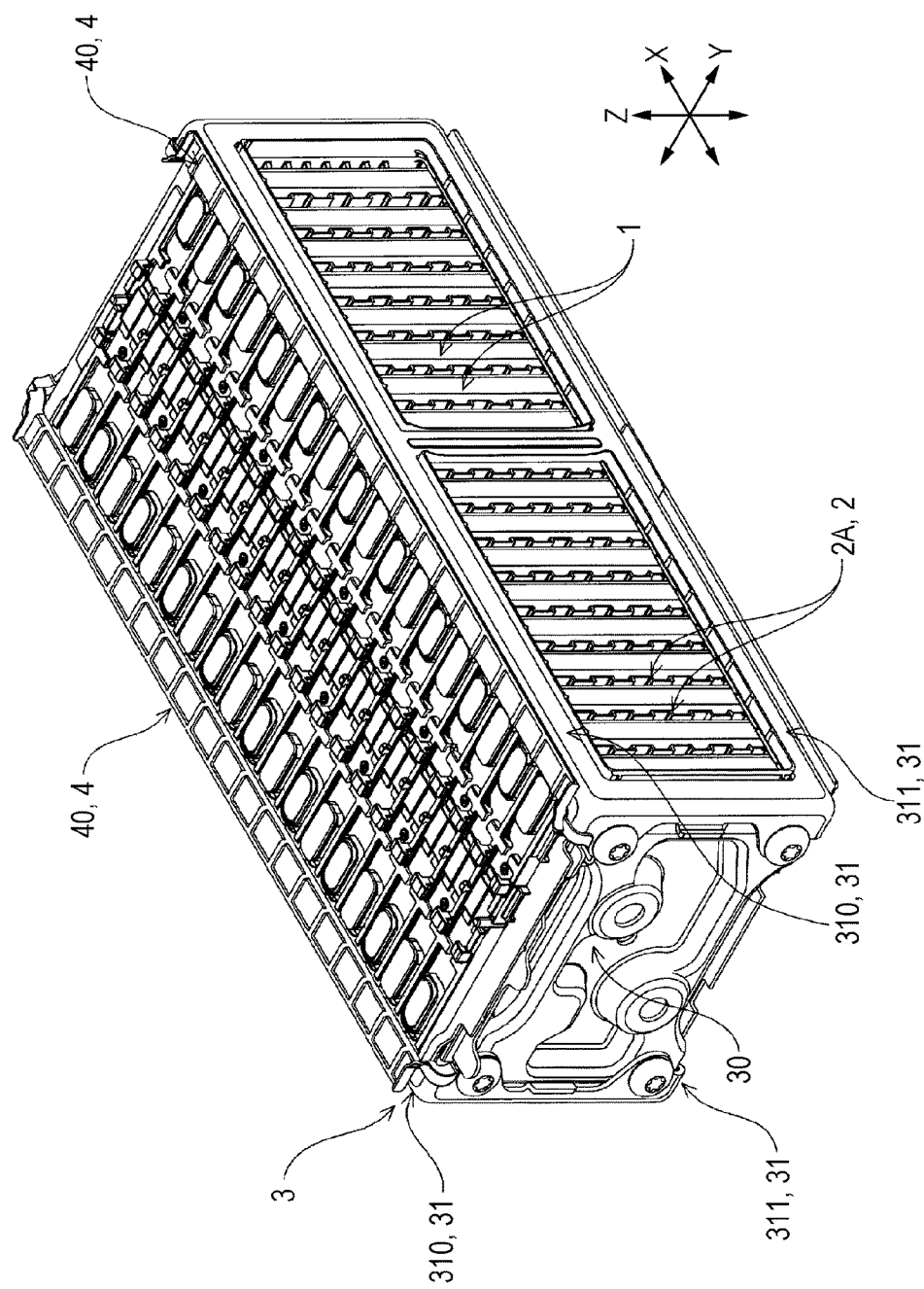
FIG. 12 is a perspective view of an energy storage apparatus according to one embodiment of the present invention.

A holder 3 includes end plates 30 each arranged adjacently to an energy storage device 1. The holder 3 of this embodiment includes, as shown in FIG. 12, a pair of end plates 30 which collectively holds (sandwiches) a plurality of energy storage devices 1 and a plurality of spacers 2. That is, the holder 3 includes the pair of end plates 30 which is arranged at positions adjacently to respective outer spacers 2B. Further, the holder 3 includes connecting members 31 which connect (join) the pair of end plates 30 to each other. The holder 3 is made of metal.

Each of the pair of end plates 30 has a first surface which opposedly faces the outer spacer 2B, and a second surface on a side opposite to the first surface. As shown in FIG. 12 to FIG. 15, each of the pair of end plates 30 has a recessed portion 300 which opens in an X axis direction (a horizontal direction or an approximately horizontal direction in FIG. 12) on the second surface. The end plate 30 of this embodiment has contact portions 305 which are brought into contact with a case (not shown in the drawings) which houses the energy storage apparatus. The end plate 30 of this embodiment is formed by molding using a metal plate. That is, the end plate 30 is a molded product formed of a metal plate. The end plate 30 has a shape (profile shape) corresponding to the energy storage device 1 as viewed in the X axis direction.

In the end plate 30, the recessed portion 300 is formed at the position corresponding to a center portion (to be more specific, a region excluding a peripheral portion) of a first wall 100c of the energy storage device 1. The recessed portion 300 is brought into contact with an outer contact portion 24B of the outer spacer 2B, and presses the first wall 100c of the energy storage device 1 via the outer spacer 2B. The recessed portion 300 has an inclined surface inclined downwardly toward the outside (toward a side opposite to the energy storage device 1 side in the X axis direction) on a lower edge portion thereof. The inclined surface is included in a peripheral surface 302a described later. To be more specific, the recessed portion 300 includes: a pressing portion 301 having a raised surface 301a extending along the energy storage device 1 (to be more specific, the first wall 100c of a case body 100); and a peripheral portion 302 which extends from the periphery of the pressing portion 301 in the direction which intersects with the raised surface 301a, the direction away from the energy storage device 1 (see FIG. 15).

The pressing portion 301 is a flat-plate-like portion having the raised surface 301a on a side thereof opposite to the energy storage device 1, and has an insertion hole 300a. The insertion hole 300a is a hole through which a male screw to be threadedly engaged with a threaded hole formed in the fitting portion 23B passes. The raised surface 301a is a planar surface (flat surface) which extends in the Y-Z plane (the plane including the Y axis direction and the Z axis direction) direction, and included in the second surface of the end plate 30. In this embodiment, the raised surface 301a is a vertical surface or an approximately vertical surface.

The peripheral portion 302 is a portion which extends from the periphery of the pressing portion 301 in an inclined state with respect to the pressing portion 301, and has the peripheral surface 302a on an inner side thereof. The peripheral surface 302a is a tapered surface. To be more specific, the peripheral surface 302a is an inclined surface which is inclined so as to be away from the pressing portion 301 in the Y-Z plane direction as the peripheral surface 302a is away from the raised surface 301a. That is, the peripheral surface 302a defines an outwardly and downwardly inclined surface at a lower edge portion of the recessed portion 300, and defines an outwardly and upwardly inclined surface at an upper edge portion of the recessed portion 300. The peripheral surface 302a also defines inclined surfaces which are more away from each other as the peripheral surface 302a extends outwardly at both side edge portions of the recessed portion 300.

Due to the formation of the pressing portion 301 and the peripheral portion 302 described above, the recessed portion 300 indented toward the energy storage device 1 is formed in the end plate 30. In this embodiment, the end plate 30 is a molded product formed of a metal plate and hence, the recessed portion 300 bulges toward the energy storage device 1 as viewed from a first surface side. Therefore, in the energy storage apparatus, a plurality of energy storage devices 1 (a group of energy storage devices) arranged in the X axis direction are pressed (sandwiched) by the pressing portions 301 from both outer sides in the X axis direction.

Accordingly, in the energy storage apparatus, the energy storage devices 1 are firmly fixed. That is, in the energy storage apparatus, the relative movement between the energy storage devices 1 can be effectively suppressed. This is because that portions (regions) of the first wall 100c excluding the peripheral portion are portions which are liable to expand at the time of charge-discharge of the energy storage device 1 in the case 10 and such regions are pressed and hence, a plurality of energy storage devices 1 arranged in a row are firmly and effectively fixed to each other.

The contact portion 305 projects more in the X axis direction than an opening edge of the recessed portion 300 (than a portion which defines an opening of the recessed portion 300 and is an edge of the peripheral portion 302 on a side opposite to the pressing portion 301). In this embodiment, the contact portion 305 has a contact surface 306 which extends in the Y-Z plane direction on a distal end thereof in the projecting direction. The contact surface 306 projects more than the opening edge of the recessed portion 300 in the X axis direction.

Figure 16:
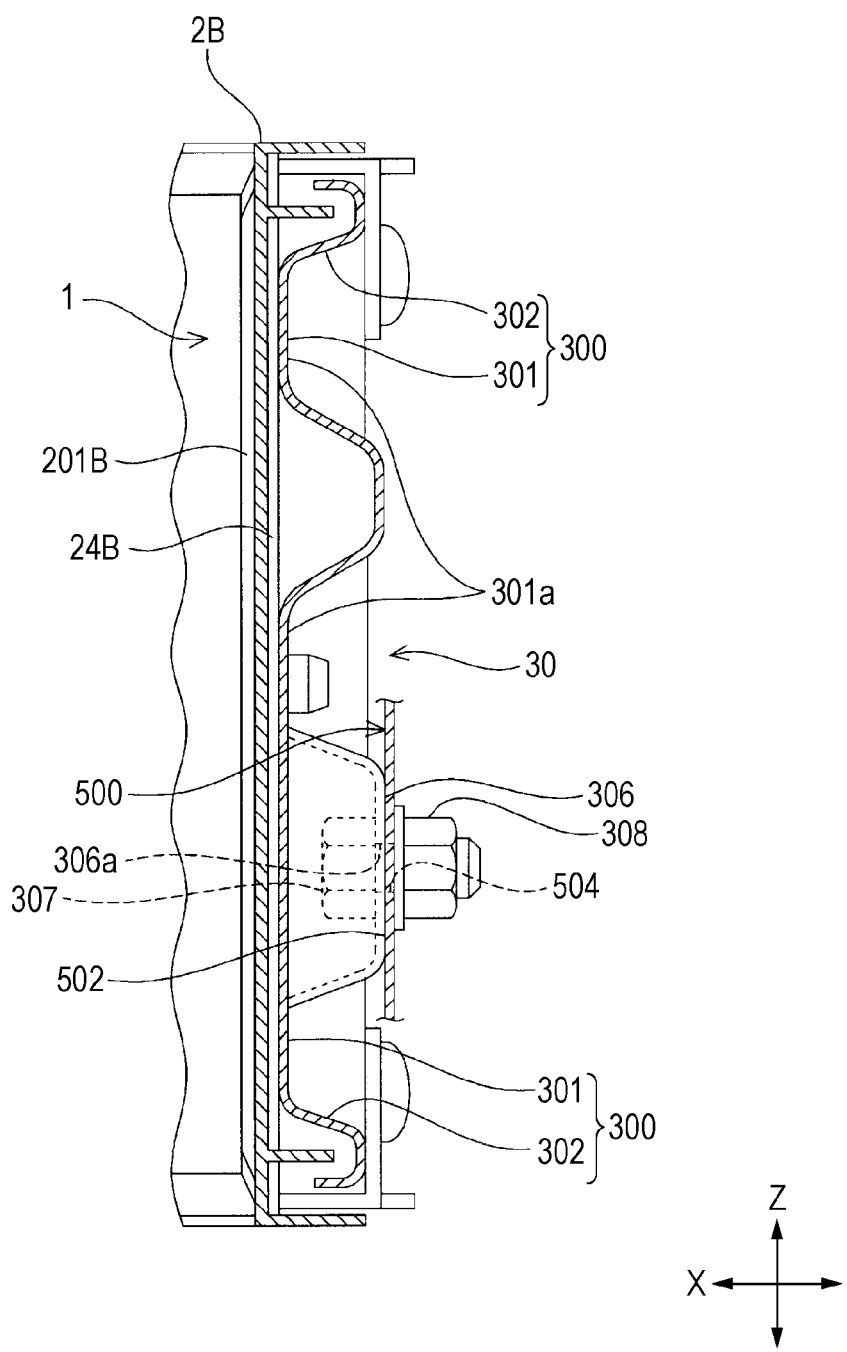
FIG. 16 is a view explaining a connection state between the energy storage apparatus and a battery pack.

The contact portion 305 has a through hole 306a at a center portion of the contact surface 306. For example, a screw for fixing the energy storage apparatus with a connecting plate 500 which connects and fixes a plurality of energy storage apparatuses to each other is made to pass through the through hole 306a. To be more specific, as shown in FIG. 16, the energy storage apparatus is fixed to the connecting plate 500 such that the contact surface 306 of the contact portion 305 is brought into contact with a contact surface 502 formed on the connecting plate 500. In this case, a bolt 307 is made to pass through a through hole 504 formed in the contact surface 502 and the through hole 306a formed in the contact portion 305 in a state where the connecting plate 500 and the contact portion 305 overlap with each other in the X axis direction, and a nut 308 is threadedly engaged with the bolt 307. Another energy storage apparatus which is arranged adjacently to the energy storage apparatus is also fixed to the connecting plate 500. Accordingly, a plurality of energy storage apparatuses are connected to each other by the connecting plate 500. The plurality of connected energy storage apparatuses are fastened to the battery pack 500 in the inside of the battery pack.

Figure 13:
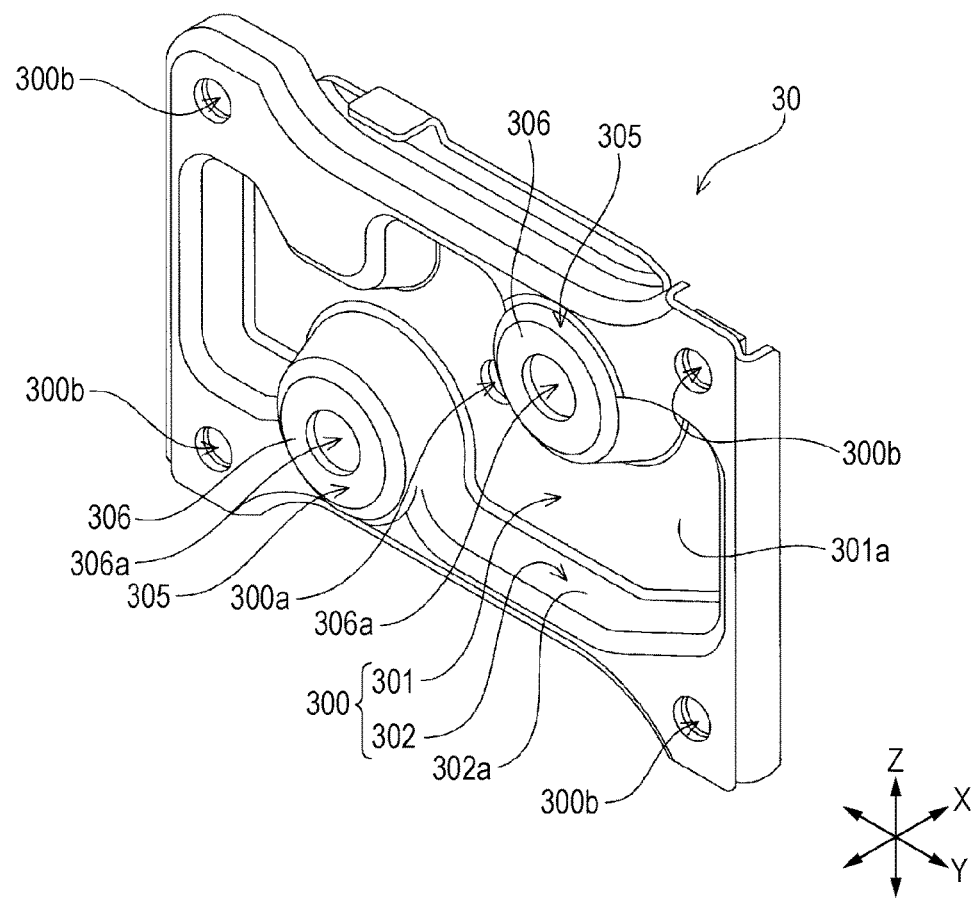
FIG. 13 is a perspective view of an end plate for energy storage devices.
Figure 14:
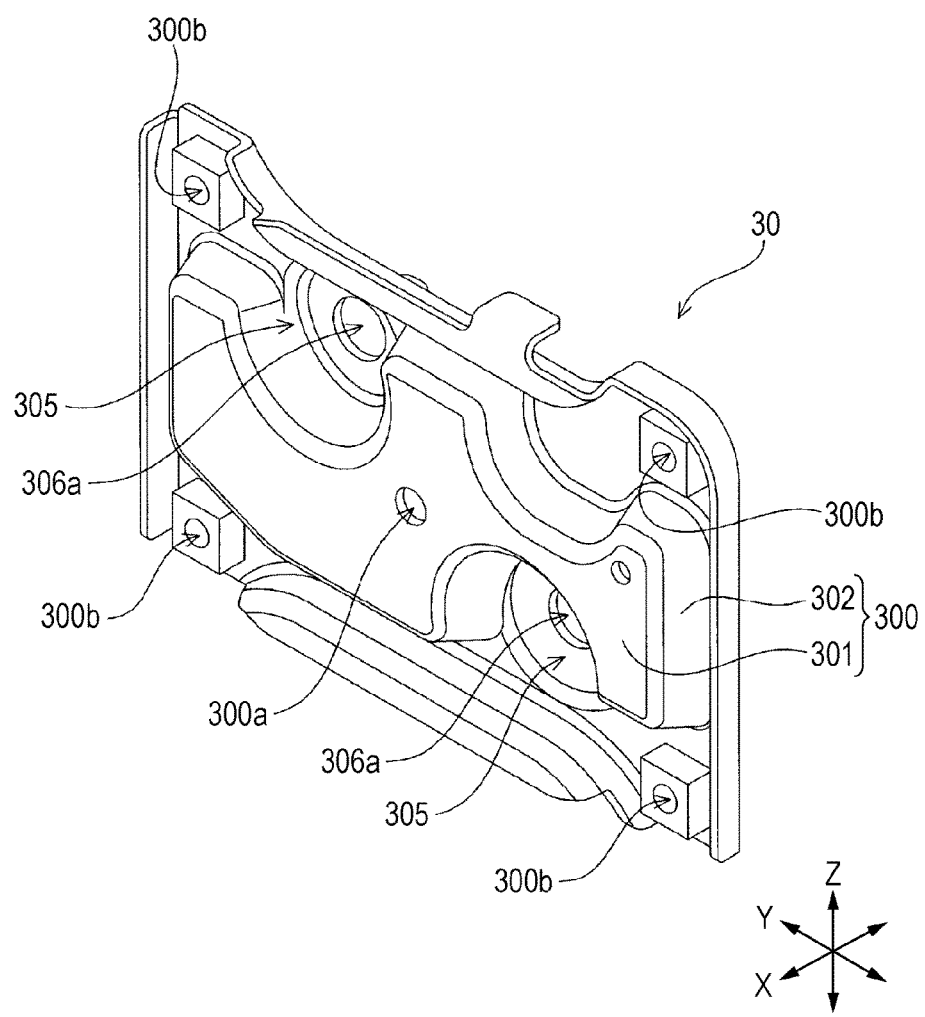
FIG. 14 is a perspective view of the end plate.
Figure 15:
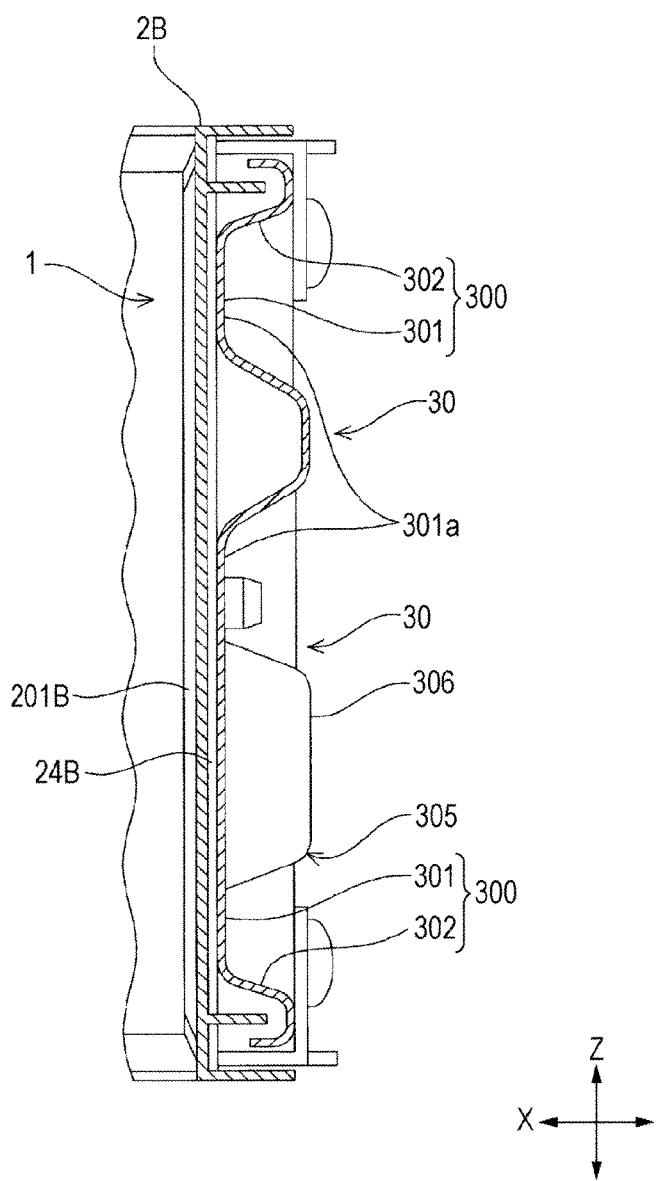
FIG. 15 is a cross-sectional view of a portion of the energy storage apparatus.

In this embodiment, the end plate 30 includes a plurality of (two in the example of this embodiment) contact portions 305. As shown in FIG. 13, the contact portions 305 project from the inside of the recessed portion 300. One contact portion 305 projects from the raised surface 301a in a state where a part of the contact portion 305 is contiguously formed with the peripheral portion 302. The other contact portion 305 projects from the raised surface 301a in a state where the other contact portion 305 is separated from the peripheral portion 302.

The connecting member 31 is arranged in the X axis direction (the direction along which the energy storage devices 1 and the end plates 30 are arranged) along the energy storage devices 1. The connecting member 31 has a fixing portion 313 which is connected to the end plate 30.

The connecting members 31 include a pair of connecting portions consisting of the first connecting portion 310 and the second connecting portion 311 which extend between the pair of end plates 30. In this embodiment, the connecting members 31 include a pair of first connecting portions 310 and a pair of second connecting portions 311. The first connecting portions 310 are arranged at positions corresponding to the lid plates 101 of the energy storage devices 1 between the pair of end plates 30. The second connecting portions 311 are arranged at positions corresponding to the closing portions 100a of the energy storage devices 1 between the pair of end plates 30. Due to such a configuration, according to this embodiment, four corners of the pair of end plates 30 are connected to each other by the pair of first connecting portions 310 and the pair of second connecting portions 311.

Each of the pair of first connecting portions 310 has a first end which is one end portion in the X axis direction (longitudinal direction) and a second end which is an end portion on a side opposite to the first end. Further, each of the pair of second connecting portions 311 has a first end which is one end portion in the X axis direction (longitudinal direction) and a second end which is an end portion on a side opposite to the first end. A fixing portion 313a is provided to one end and the other end of the first connecting portion 310. Further, a fixing portion 313b is provided to one end and the other end of the second connecting portion 311.

The fixing portions 313a, 313b can overlap with the end plate 30 from the outside in the X axis direction. This structure is explained more specifically. The fixing portion 313a extends from the first end and the second end of the connecting portion 310, and the fixing portion 313b extends from the first end and the second end of the connecting portion 311. The fixing portions 313a and 313b are plate-like portions along an outer surface (second surface) of the end plate 30. The fixing portions 313a, 313b face portions around the respective through holes 300b in the outer surface of the end plate 30. First holes 313c, 313d are formed in the fixing portions 313a, 313b, respectively, at positions corresponding to the through holes 300b.

The first connecting portion 310 and the second connecting portion 311 having the above-mentioned constitution are connected to the end plate 30 by threadedly engaging nuts to bolts which are made to pass through the through holes 300b formed in the end plate 30 and the first holes 313c, 313d formed in the fixing portions 313a, 313b. Due to such a configuration, four corners of the pair of end plates 30 are connected to each other by the first and second connecting portions 310, 311. That is, in this embodiment, the connecting portions of connecting members 31 are provided at four positions for one end plate 30.

An insulator 4 is formed using a material having an insulating property. The insulator 4 includes: a pair of first insulating portions 40 arranged between the pair of first connecting portions 310 and the energy storage device 1; and a pair of second insulating portions 41 arranged between the pair of second connecting portions 311 and the energy storage device 1.

According to the above-mentioned energy storage apparatus, water which condensates in the recessed portion 300 and water which condensates in other portions (portions excluding the recessed portion) of the end plate 30 and enters the recessed portion are discharged to the outside by way of the lower edge portion of the recessed portion 300 along the inclined surface (a portion of the peripheral surface 302a on a lower side). Accordingly, water minimally stagnates in the recessed portion 300.

Figure 17:
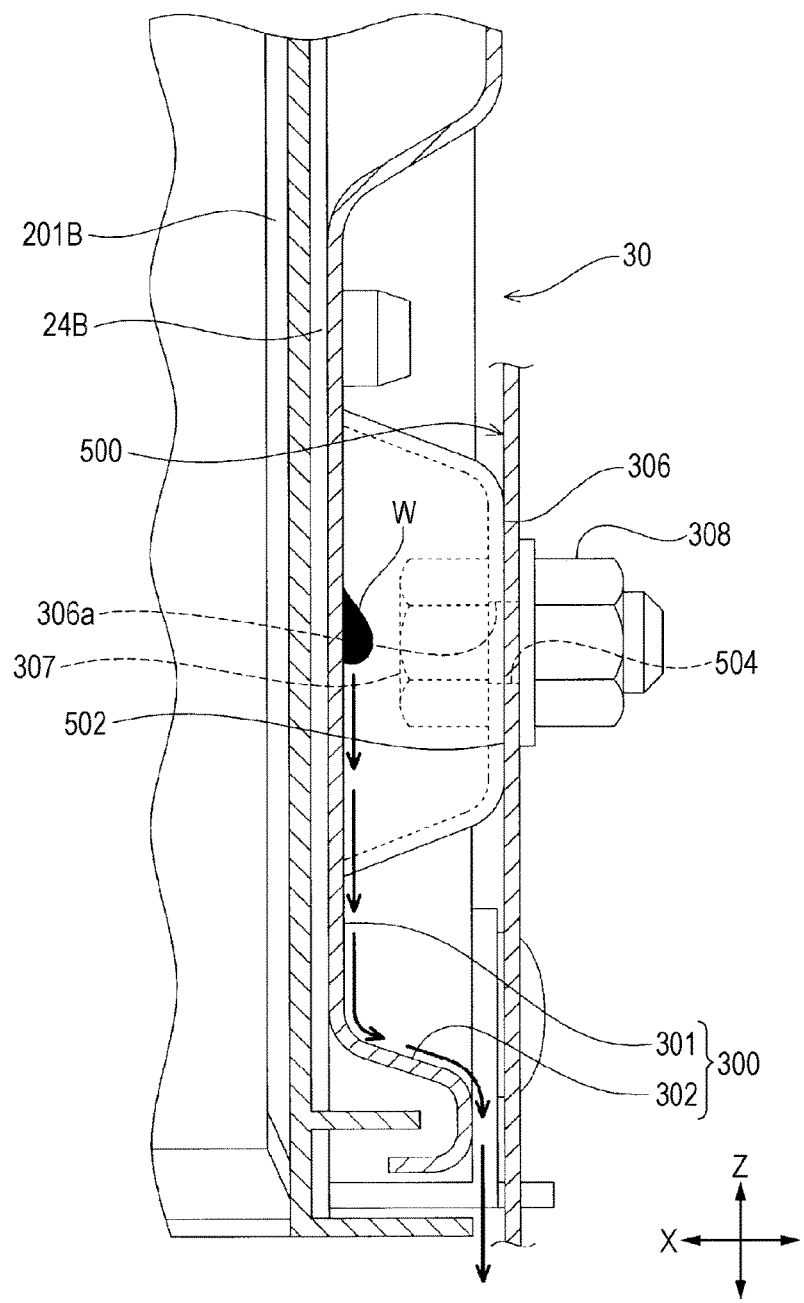
FIG. 17 is a view explaining the flow of water discharged from a recessed portion.

In the energy storage apparatus of this embodiment, the contact portion 305 projects more than the opening edge of the recessed portion 300. Accordingly, as shown in FIG. 16, when the energy storage apparatus is housed in the battery pack (case) and the contact portion 305 is brought into contact with the battery pack, a gap is formed between the opening edge of the recessed portion 300 and an inner surface of the battery pack and hence, as shown in FIG. 17, water (water produced by condensation or the like) W in the recessed portion 300 is not confined in the recessed portion 300 and is discharged to the outside of the recessed portion through the gap. In the battery pack of this embodiment, although the contact surface 502 projects toward an energy storage apparatus side (a side where the contact portion 305 of the end plate 30 is disposed) with respect to the surface around the contact surface 502, the contact surface 502 and the surface around the contact surface 502 may form a common surface. Also in this case, the contact portion 305 of the end plate 30 projects more than the opening edge of the recessed portion 300 and hence, the above-mentioned gap (gap through which water can be discharged, that is, the gap corresponding to a projection amount of the contact portion 305 from the opening edge) is formed between the opening edge of the recessed portion 300 and the inner surface of the battery pack 500.

In the energy storage apparatus of this embodiment, the contact portion 305 projects from the inside of the recessed portion 300 and hence, it is unnecessary to ensure a space for forming the contact portion 305 outside the recessed portion 300 (outside the recessed portion 300 in the Y-Z plane direction) in the end plate 30. Accordingly, the end plate 30 can be miniaturized.

In the energy storage apparatus of this embodiment, the recessed portion 300 has the raised surface 301a and the inclined surface which extends from the lower edge of the raised surface 301a (surface included in the peripheral surface 302a). Accordingly, water produced by condensation or the like in the recessed portion 300 easily flows to a lower edge of the raised surface 301a, that is, a lower edge portion of the recessed portion 300 along the raised surface 301a. Accordingly, water produced due to condensation or the like in the recessed portion 300 can be discharged with more certainty.

It is needless to say that the present invention is not limited to the above-mentioned embodiment, and various modifications are conceivable without departing from the gist of the present invention.

Figure 18:
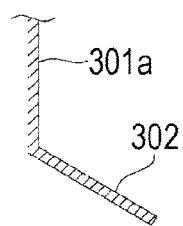
FIG. 18 is a cross-sectional view showing a portion of an end plate according to another embodiment.
Figure 19:
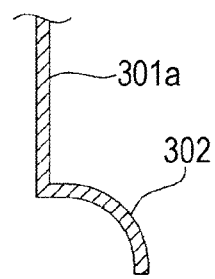
FIG. 19 is a cross-sectional view showing a portion of an end plate according to another embodiment.

The specific constitution of the inclined surface formed on the lower edge portion of the recessed portion 300 is not limited. For example, as shown in FIG. 18 and FIG. 19, the inclined surface may be formed of a planar surface having a fixed angle with respect to the horizontal direction, a curved surface whose inclination with respect to the horizontal direction is gradually increased as the curved surface extends outward or the like. Further, the inclined surface may be formed by combining a planar surface and a curved surface. That is, it is sufficient that the inclined surface is an inclined surface having a shape which allows water in the recessed portion 300 to be easily discharged to the outside through the opening (opening of the recessed portion 300) when water in the recessed portion 300 is collected to the lower edge portion of the recessed portion 300.

Although the end plate 30 of this embodiment includes two contact portions 305, the present invention is not limited to such a configuration. For example, the end plate 30 may include one contact portion 305 or may include three or more contact portions 305.

In the end plate 30 of the above-mentioned embodiment, the recessed portion which is recessed toward a first surface side from the second surface (the recessed portion having the outwardly and downwardly inclined surface on a lower edge portion thereof) 300 is formed. However, the end plate 30 is not limited to such a configuration. The recessed portion 300 may be formed such that the recessed portion 300 is recessed toward a second surface side from the first surface of the end plate 30. Further, the recessed portion 300 may be formed on both surfaces (the first surface and the second surface) of the end plate 30. Provided that the recessed portion 300 has the outwardly and downwardly inclined surface on the lower edge portion thereof, regardless of whether the recessed portion 300 is formed on the first surface or the second surface, water which condensates in the recessed portion 300 and water which condensates on portions of the end plate 30 excluding the recessed portion 300 and flows into the recessed portion 300 are discharged to the outside by way of the lower edge portion of the recessed portion 300 along the inclined surface and hence, water minimally stagnates in the recessed portion 300.

Figure 20:
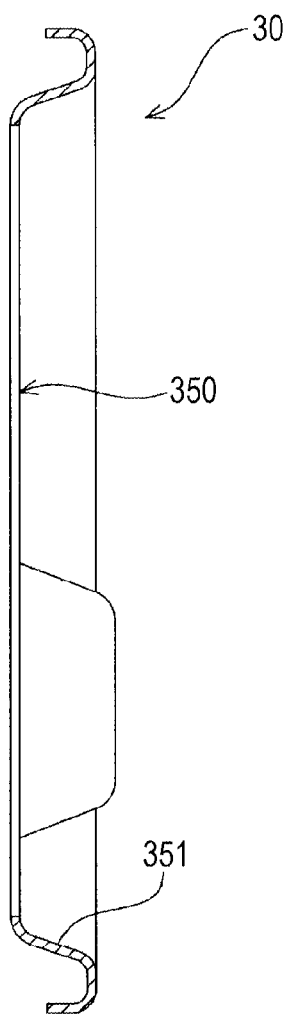
FIG. 20 is a cross-sectional view explaining an end plate according to another embodiment.

In the end plate 30, the portion where the outwardly and downwardly inclined surface is provided is not limited to the recessed portion formed on the first surface or the second surface. For example, as shown in FIG. 20, a through hole 350 may be formed in the end plate 30 in a penetrating manner from a first surface to a second surface, and at least a lower region of an inner peripheral surface 351 which defines the through hole 350 may be formed of an inclined surface inclined downwardly toward the second surface from the first surface. That is, in the end plate 30, at least a partial region of the inner peripheral surface 351 in the circumferential direction which defines the through hole 350 may be an inclined surface which is inclined in the direction that the through hole 350 is increased along with the increase of a distance from one opening (for example, an opening on the first surface side) to the other opening (the opening on a second surface side, for example) in the through hole. Also due to such a configuration, by arranging the energy storage apparatus in a posture where the penetration direction is equal to a horizontal direction or an approximately horizontal direction, and the region of the inner peripheral surface 351 formed of the inclined surface is at a lower portion, water which condensates on the inner peripheral surface 351 is discharged through the through hole 350 along the inclined surface of the lower portion at the inner peripheral surface 351 and hence, water minimally stagnates in the through hole 350 (inner peripheral surface 351).

The end plate 30 of the above-embodiment is a molded product formed of a metal plate. However, the present invention is not limited to such a configuration. The end plate 30 may be formed of a member having a large plate thickness. Also in this case, provided that the recessed portion 300 formed on the end plate 30 has an outwardly and downwardly inclined surface on a lower edge portion, water which condensates on a surface of the end plate 30 minimally stagnates in the recessed portion 300.

The recessed portion 300 of the above-mentioned embodiment has the raised surface 301a which is a vertical surface. However, the present invention is not limited to such a configuration. For example, in the recessed portion 300, an inner surface may be formed of only a curved surface.

The end plate 30 of the above-mentioned embodiment has one recessed portion 300. However, the end plate 30 may have a plurality of recessed portions 300.

Conventionally, there has been known an energy storage apparatus which includes battery cells and is mounted on an automobile or the like (see JP-A-2008-130374). To be more specific, the energy storage apparatus includes: a plurality of battery cells arranged in a row; and a pair of endplates which sandwiches the plurality of battery cells therebetween. Each of the pair of endplates is formed of a resin-made plate-like member. In such an energy storage apparatus, the plurality of battery cells are firmly fixed to each other by ensuring the strength of the endplate by increasing a plate thickness of the endplate.

Recently, there has been a demand for the miniaturization of an energy storage apparatus. In this respect, to ensure the strength of the endplate by increasing a plate thickness of the endplate as in the case of the above-mentioned energy storage apparatus, the energy storage apparatus is increased in size. In view of the above, a thickness of the endplate may be decreased while ensuring the strength of the endplate by forming the endplate using a metal plate or the like. In this case, for example, by forming a projecting portion such as a rib on a periphery of a portion which presses a battery cell on the metal-made endplate, even an endplate having a small plate thickness can ensure a sufficient strength.

However, depending on the direction that the projecting portion projects, there may be a case where a distal end of the projecting portion is liable to be brought into contact with the battery cell, a member arranged on the periphery of the endplate or the like. In this case, it is considered that when an external force, vibrations or the like are applied to the energy storage apparatus, the distal end of the projecting portion is brought into contact with the energy storage device, the member or the like thus causing a flaw or the like on the energy storage device, the member or the like.

With respect to the energy storage apparatus provided with end plates on which a projecting portion is formed, there has been a demand for an energy storage apparatus where the projecting portion is minimally brought into contact with the energy storage device and the member arranged around the end plate.

(1) The energy storage apparatus includes:
an energy storage device; and
a holder which holds the energy storage device, wherein
the holder has an end plate arranged adjacent to the energy storage device in a first direction,
the end plate has: a bulging portion which bulges toward the energy storage device and presses the energy storage device; and a projecting portion which is arranged around the bulging portion and extends toward the energy storage device, and
a distal end of the projecting portion is positioned more away from the energy storage device than the bulging portion in the first direction.

Due to such a configuration, the energy storage device is pressed by the bulging portion and hence, the energy storage device can be firmly held by the holder. Further, the projecting portion formed on the end plate extends toward the energy storage device and hence, the projecting portion is minimally brought into contact with members arranged around the end plate (the members or the like excluding the end plate which form the holder), and the distal end of the projecting portion is positioned more away from the energy storage device than the bulging portion in the direction that the end plate and the energy storage device are adjacent (first direction) and hence, even when an external force, vibrations or the like are applied to the energy storage apparatus so that the end plate is deformed or the like, the distal end (edge or the like) of the projecting portion is minimally brought into contact with the energy storage device.

(2) In the energy storage apparatus described in the above-mentioned (1), the bulging portion includes: a pressing portion formed of a metal plate and having a pressing surface which is a planar surface extending along the energy storage device; and a reinforcing portion extending from a periphery of the pressing portion in a direction which intersects with the pressing surface and also in a direction away from the energy storage device.

With such a configuration, the reinforcing portion is inclined or is orthogonal with respect to the pressing portion and hence, even when the bulging portion is formed of a metal plate having a small plate thickness, the strength of the bulging portion can be sufficiently ensured and, at the same time, a planar surface (pressing surface) extending along the energy storage device is formed on the end plate and hence, the area of a portion of the end plate which presses the energy storage device 1 can be sufficiently ensured whereby the energy storage device 1 can be firmly fixed in the energy storage apparatus.

(3) In the energy storage apparatus described in the above-mentioned (2), it is preferable that the end plate be formed of a metal plate and includes an extending portion extending toward the outside of the bulging portion from a distal end of the reinforcing portion,
the projecting portion extends from the extending portion in a direction which intersects with the extending direction of the extending portion and in a direction which extends toward the energy storage device, and
a distance from a boundary portion between the reinforcing portion and the extending portion to the distal end of the projecting portion is smaller than a distance from the energy storage device to the boundary portion in a direction that the energy storage device and the end plate are adjacent.

With such a configuration, the extending portion is bent with respect to the reinforcing portion, and the projecting portion which extends from the extending portion in a direction which intersects with the extending portion is provided. Accordingly, even when the whole end plate is formed of a metal plate having a small plate thickness, the end plate can ensure a sufficient strength.

Further, even when the extending portion of the end plate is bent more (bent more largely than bending in a normal state) at the boundary portion between the extending portion and the reinforcing portion due to an external force, a portion of the end plate more exterior than the boundary portion (that is, the extending portion and the projecting portion) is bent such that the distal end of the projecting portion extending from the extending portion passes along an arcuate trajectory having the center at the boundary portion and hence, the distal end of the projecting portion is minimally brought into contact with the energy storage device.

(4) In the energy storage apparatus described in the above-mentioned (3), it is preferable that the energy storage apparatus includes an outer spacer arranged between the energy storage device and the end plate, and
the outer spacer includes: a base which extends along the energy storage device; and a deformation restricting portion which extends toward the extending portion from a position on the base corresponding to the extending portion.

With such a configuration, when the end plate is bent at the boundary portion between the reinforcing portion and the extending portion by an external force, the projecting portion extending from the extending portion is brought into contact with the deformation restricting portion so that the further bending of the end plate at the boundary portion can be restricted and hence, the distal end of the projecting portion is minimally brought into contact with the energy storage device.

(5) In the energy storage apparatus described in above-mentioned (4), a distance form a distal end of the deformation restricting portion to the extending portion in the first direction may be set smaller than a distance from the base to the distal end of the projecting portion in the first direction.

With such a configuration, even when the end plate is deformed such that the distal end of the projecting portion moves toward the energy storage device due to a force or the like applied to the whole end plate in the direction toward the energy storage device, the deformation restricting portion is brought into contact with the extending portion before the distal end of the projecting portion reaches the base (energy storage device) and hence, the further approach (contact) of the distal end of the projecting portion to the base can be prevented. As a result, even when the end plate is deformed such that the distal end of the projecting portion moves toward the energy storage device, the distal end of the projecting portion is minimally brought into contact with the energy storage device.

Figure 21:
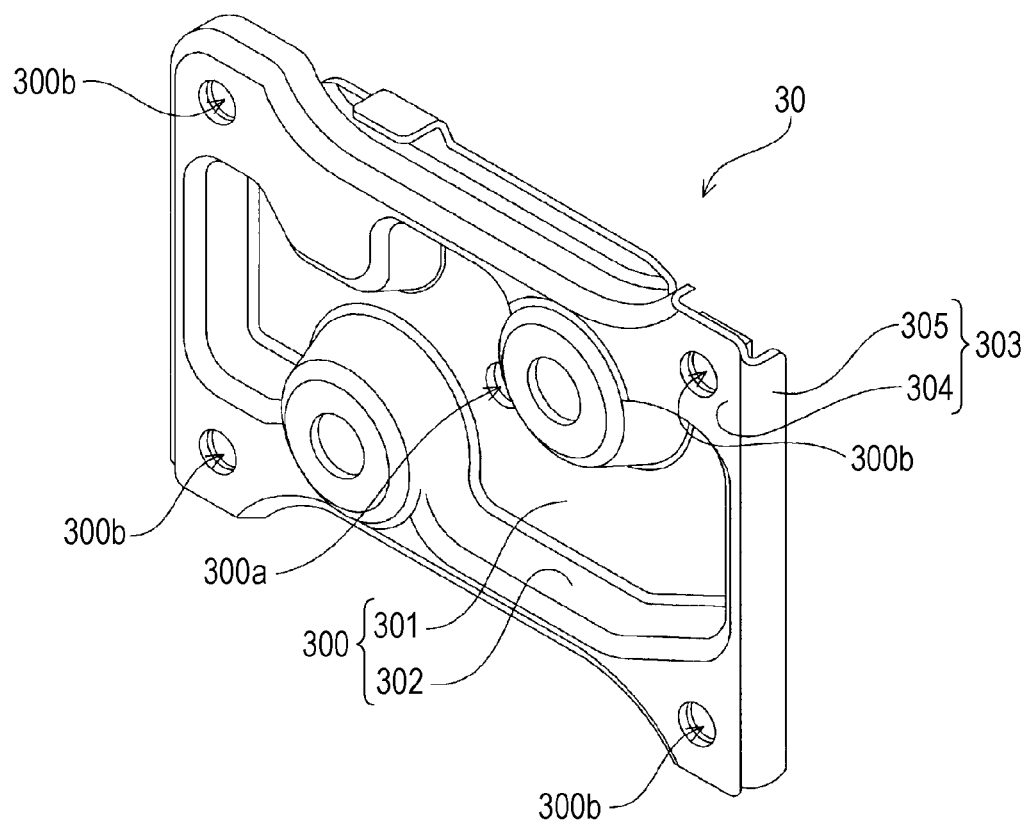
FIG. 21 is a perspective view of an end plate for energy storage devices.
Figure 22:
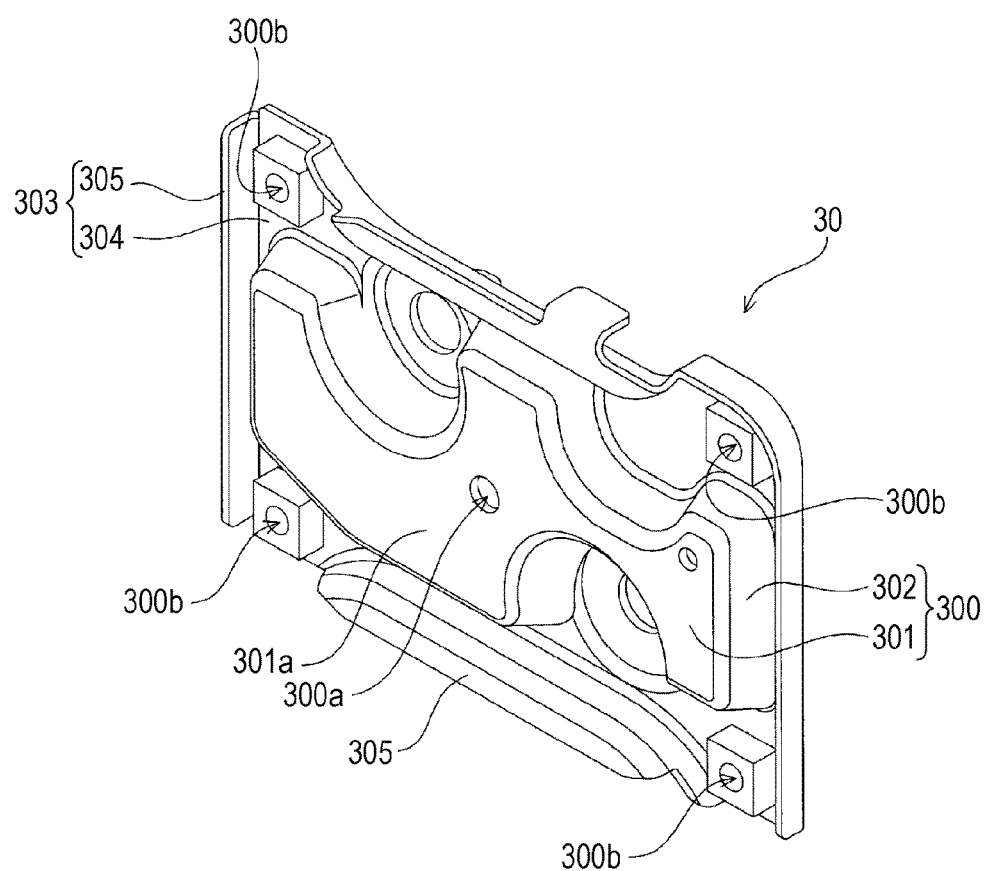
FIG. 22 is a perspective view of the end plate.
Figure 23:
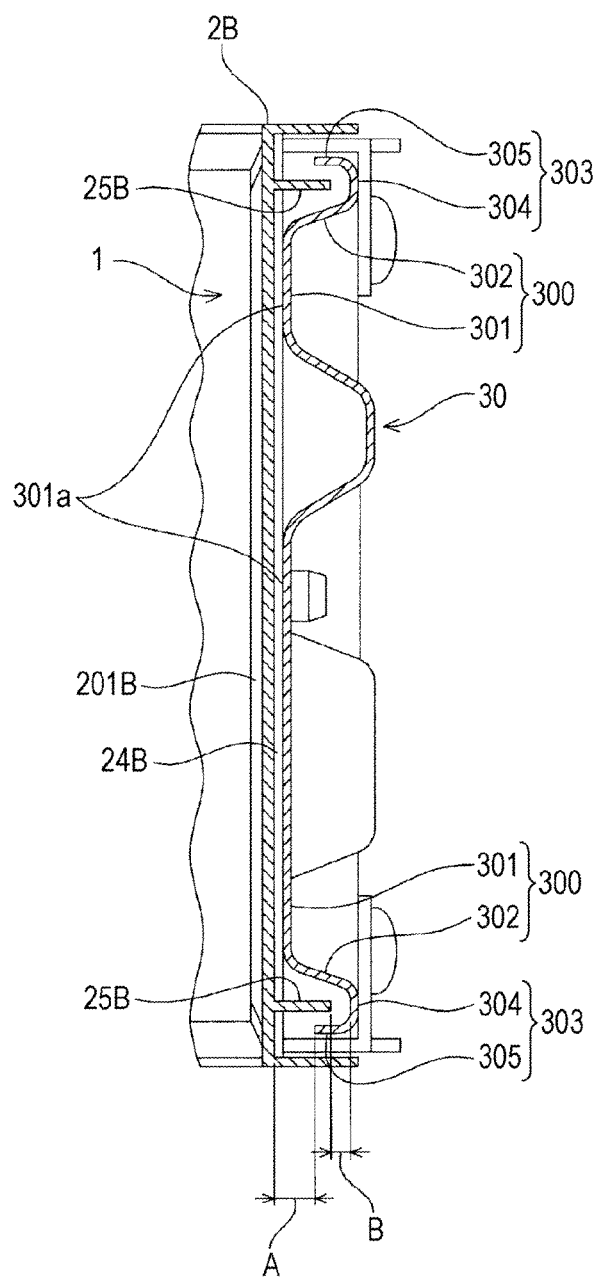
FIG. 23 is a transverse cross-sectional view of a portion of an energy storage apparatus.

Each of a pair of end plates 30 includes: a first surface which opposedly faces an outer spacer 2B; and a second surface disposed on a side opposite to the first surface. As shown in FIGS. 21 to 23, each of the pair of end plates 30 includes: a bulging portion 300 which bulges toward an energy storage device 1 and presses the energy storage device 1; and a projecting portion 305 which is arranged around the bulging portion 300 and extends toward the energy storage device 1. The projecting portion 305 is included in a peripheral portion 303 arranged (disposed) around the bulging portion 300. That is, the end plate 30 includes the bulging portion 300 and the peripheral portion 303, and the peripheral portion 303 includes the projecting portion 305. The end plate 30 of this embodiment is formed by molding using a metal plate. That is, the end plate 30 is a molded product of a metal plate. The end plate 30 has a shape (profile shape) corresponding to the energy storage device 1 as viewed in the X axis direction.

In the end plate 30, the bulging portion 300 is formed at a position corresponding to a center portion (to be more specific, a region excluding a peripheral portion) of a first wall 100c of the energy storage device 1. The bulging portion 300 of this embodiment is brought into contact with an outer contact portion 24B of the outer spacer 2B, and presses the first wall 100c of the energy storage device 1 via the outer spacer 2B. To be more specific, the bulging portion 300 includes: a pressing portion 301 having a pressing surface 301a which extends along the energy storage device 1 (to be more specific, the first wall 100c of a case body 100); and a reinforcing portion 302 which extends from the periphery of the pressing portion 301 in a direction which intersects with the pressing surface 301a and being away from the energy storage device 1 (see FIG. 23).

The pressing surface 301a is a planar surface (flat surface) which extends in a Y axis direction as well as in a Z axis direction, and is included in the first surface of the end plate 30. The pressing portion 301 is a flat plate like portion having the pressing surface 301a on an energy storage device 1 side, and has an insertion hole 300a. The insertion hole 300a is a hole which allows a fitting portion 23B to pass therethrough. The reinforcing portion 302 is a portion which extends from the periphery of the pressing portion 301 in a state where the reinforcing portion 302 is inclined with respect to the pressing portion 301.

The bulging portion 300 which bulges toward the energy storage device 1 is formed by the pressing portion 301 and the reinforcing portion 302, and a plurality of energy storage devices 1 (a group of energy storage devices) arranged in a row in the X axis direction are pressed (sandwiched) by the bulging portions 300 from both outer sides in the X axis direction. Accordingly, in the energy storage apparatus, the energy storage devices 1 are firmly fixed. That is, in the energy storage apparatus, the relative movement between the energy storage devices 1 can be effectively suppressed. This is because the portion (region) of the first wall 100c excluding the peripheral portion is a portion in the case 10 which is easily expanded at the time of charge-discharge of the energy storage device 1, and the plurality of energy storage devices 1 arranged in a row can be firmly and effectively fixed to each other by pressing such a region.

The peripheral portion 303 includes: an extending portion 304 which extends toward the outside of the bulging portion 300 from a distal end (an end portion on a side remote from the energy storage device 1) of the reinforcing portion 302; and a projecting portion 305 which extends toward the energy storage device 1 from a distal end (an end portion on a side remote from the bulging portion 300) of the extending portion 304.

The extending portion 304 is a flange-like portion which extends toward the outside of the bulging portion 300 from an end portion of the reinforcing portion 302.

The projecting portion 305 extends from a distal end of the extending portion 304 in a direction which intersects with (orthogonal to in this embodiment) the extending portion 304. The distal end (an end portion on a side close to the energy storage device 1) of the projecting portion 305 is at a position which does not go beyond the bulging portion 300 (to be more specific, the pressing surface 301a) in the X axis direction. That is, the distal end of the projecting portion 305 is at a position more away from the energy storage device 1 than the bulging portion 300 in the X axis direction. A distance A from the base 20B to the distal end of the projecting portion 305 is larger than a distance B from the distal end of the deformation restricting portion 25B to the extending portion 304 (see FIG. 23). The projecting portion 305 of this embodiment is formed of an outer peripheral portion (a portion including an outer periphery) of the end plate 30.

In the end plate 30, through holes 300b are formed in respective corner portions around the bulging portion 300. The through holes 300b are, as described previously, used for connecting the fixing portions 313a, 313b of the connecting member 31 and the end plate 30.

Figure 24:
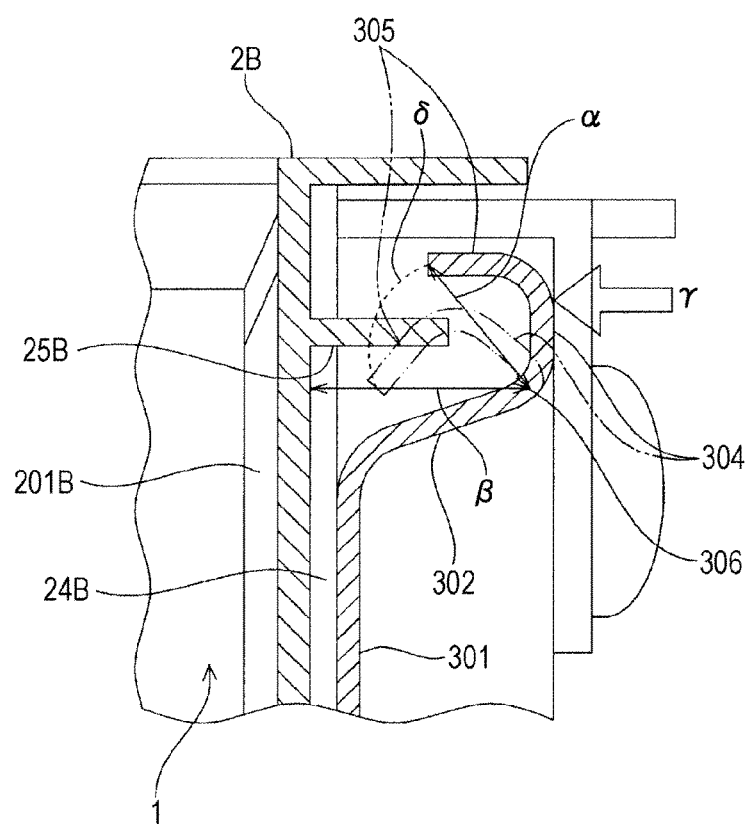
FIG. 24 is a view explaining a state where a force is applied to an extending portion of the end plate to bend a peripheral portion.

As shown in FIG. 24, in the end plate 30 having the above-mentioned configuration, a distance α from a boundary portion 306 between the reinforcing portion 302 and the extending portion 304 to the distal end of the projecting portion 305 is set smaller than a distance β from the outer spacer 2B to the boundary portion 306 in the X axis direction. With such a configuration, even when an external force γ is applied to the extending portion 304 or the like so that the peripheral portion 303 of the end plate 30 is bent (bent largely compared to bending in a normal state) more at the boundary portion 306, the peripheral portion 303 is bent such that the distal end of the projecting portion 305 passes along an arcuate trajectory 6 having the center at the boundary portion 306. Accordingly, in the energy storage apparatus of this embodiment, even when the peripheral portion 303 is bent by an external force or the like, the distal end of the projecting portion 305 is minimally brought into contact with the energy storage device 1.

The connecting member 31 is arranged in the X axis direction (the direction where the energy storage devices 1 and the end plates 30 are arranged in a row) along the energy storage devices 1. The connecting member 31 has a fixing portion 313 connected to the end plate 30.

The connecting members 31 include a pair of first connecting portions 310 and a second connecting portion 311 which extend between the pair of end plates 30. In this embodiment, the connecting members 31 include a pair of first connecting portions 310 and a pair of second connecting portions 311. The first connecting portions 310 are arranged at positions corresponding to the lid plates 101 of the energy storage devices 1 between the pair of end plates 30. The second connecting portions 311 are arranged at positions corresponding to the closing portions 100a of the energy storage devices 1 between the pair of end plates 30. Due to such a configuration, according to this embodiment, four corners of the pair of end plates 30 are connected to each other by the pair of first connecting portions 310 and the pair of second connecting portions 311.

Each of the pair of first connecting portions 310 has a first end which is one end portion in the X axis direction (longitudinal direction) and a second end which is an end portion on a side opposite to the first end. Further, each of the pair of second connecting portions 311 has a first end which is one end portion in the X axis direction (longitudinal direction) and a second end which is an end portion on a side opposite to the first end. A fixing portion 313a is provided to one end and the other end of the first connecting portion 310. Further, a fixing portion 313b is provided to one end and the other end of the second connecting portion 311.

The fixing portions 313a, 313b can overlap with the end plate 30 from the outside in the X axis direction. This structure is explained more specifically. The fixing portion 313a extends from the first end and the second end of the connecting portion 310, and the fixing portion 313b extends from the first end and the second end of the connecting portion 311. The fixing portions 313a and 313b are plate-like portions along an outer surface (second surface) of the end plate 30. The fixing portions 313a, 313b face portions around the respective through holes 300b in the outer surface of the end plate 30. First holes 313c, 313d are formed in the fixing portions 313a, 313b, respectively, at positions corresponding to the through holes 300b.

The first connecting portion 310 and the second connecting portion 311 having the above-mentioned constitution are connected to the end plate 30 by threadedly engaging nuts to bolts which are made to pass through the through holes 300b formed in the end plate 30 and the first holes 313c, 313d formed in the fixing portion 313. Due to such a configuration, four corners of the pair of end plates 30 are connected to each other by the first and second connecting portions 310, 311. That is, in this embodiment, the connecting portions of connecting members 31 are provided at four positions for one end plate 30.

An insulator 4 is formed using a material having an insulating property. The insulator 4 includes: a pair of first insulating portions 40 arranged between the pair of first connecting portions 310 and the energy storage device 1; and a pair of second insulating portions 41 arranged between the pair of second connecting portions 311 and the energy storage device 1.

According to the energy storage apparatus described above, the projecting portion 305 of the end plate 30 extends toward the energy storage device 1 and hence, the projecting portion 305 is minimally brought into contact with the members arranged around the end plate 30 (members (excluding the energy storage device 1) and the like excluding the end plate 30 constituting the holder 3). Further, the distal end of the projecting portion 305 is at a position more away from the energy storage device 1 than the bulging portion 300 in the X axis direction (the direction toward the energy storage device from the end plate 30) and hence, even when an external force, vibrations or the like are applied to the energy storage apparatus so that the end plate 30 is deformed or the like, the distal end (edge or the like) of the projecting portion 305 is minimally brought into contact with the energy storage device 1.

The reinforcing portion 302 is inclined or is orthogonal with respect to the pressing portion 301 and hence, even when the bulging portion 300 is formed of a metal plate having a small plate thickness, the strength of the bulging portion 300 can be sufficiently ensured. Further, in the end plate 30, the extending portion 304 is bent with respect to the reinforcing portion 302 and the projecting portion 305 extending from the extending portion 304 in the direction which intersects with the extending portion 304 is provided and hence, even when the whole end plate 30 is formed using a metal plate having a small plate thickness, the end plate 30 can ensure a sufficient strength.

In the energy storage apparatus of this embodiment, the planar surface (pressing surface) 301a extending along the energy storage device 1 is formed on the end plate 30 and hence, the area of a portion of the end plate 30 which presses the energy storage device 1 can be sufficiently ensured whereby the energy storage device 1 can be firmly fixed in the energy storage apparatus.

In the energy storage apparatus of this embodiment, the deformation restricting portion 25B is formed on the outer spacer 2B. With such a configuration, when the peripheral portion 303 of the end plate 30 is bent more by an external force on the boundary portion between the reinforcing portion 302 and the extending portion 304, the projecting portion 305 is brought into contact with the deformation restricting portion 25B and hence, the further bending of the peripheral portion 303 at the boundary portion can be restricted. As a result, the distal end of the projecting portion 305 is further minimally brought into contact with the energy storage device 1.

In the energy storage apparatus of this embodiment, the distance A from the base 20B to the distal end of the projecting portion 305 is larger than the distance B from the distal end of the deformation restricting portion 25B to the extending portion 304 (see FIG. 23). Accordingly, even when a force or the like in the direction directed to the energy storage device 1 is applied to the whole end plate 30 and the end plate 30 is deformed such that the distal end of the projecting portion 305 moves toward the energy storage device 1, the distal end of the deformation restricting portion 25B is brought into contact with the extending portion 304 before the distal end of the projecting portion 305 reaches the base 20B (energy storage device 1). Accordingly, the further approach of the distal end of the projecting portion 305 to the base 20B (that is, the approach of the distal end of the projecting portion 305 to the base 20B beyond a position where the distal end of the deformation restricting portion 25B is brought into contact with the extending portion 304) can be prevented. As a result, ever when the end plate 30 is deformed such that the distal end of the projecting portion 305 moves toward the energy storage device 1, the distal end of the projecting portion 305 is minimally brought into contact with the energy storage device 1.

It is needless to say that the present invention is not limited to the above-mentioned embodiments, and various modifications are conceivable within the gist of the present invention.

In the energy storage apparatuses according to the above-mentioned embodiments, the outer spacer 2B is arranged between the end plate 30 and the outermost energy storage device 1 out of a plurality of energy storage devices 1 arranged in a row in one direction. However, the present invention is not limited such a configuration. That is, the outer spacer 2B may not be arranged between the outermost energy storage device 1 and the end plate 30. In this case, it is preferable that an insulation layer be mounted on a surface (first surface) which faces an energy storage device 1 side of the end plate 30 so as to insulate the end plate 30 and the outermost energy storage device 1 from each other.

In the above-mentioned embodiments, the end plate 30 has one bulging portion 300. However, the present invention is not limited to such a configuration. The end plate 30 may have a plurality of bulging portions 300.

The specific configuration of the projecting portion 305 is not limited. For example, although the projecting portion 305 of the above-mentioned embodiment is provided at the position which includes the outer periphery of the end plate 30, the projecting portion 305 may be provided at the position inside the outer periphery (that is, the position which does not include the outer periphery). The projecting portion 305 may be continuously or intermittently provided around the bulging portion 300 over the whole circumference of the bulging portion 300. Further, the projecting portion 305 may be provided only over a part of the circumference of the bulging portion 300.

In the end plate 30 in the above-mentioned embodiments, although the projecting portion 305 projects from the extending portion 304, the projecting portion 305 may project from the reinforcing portion 302.

In the above-mentioned embodiments, the bulging portion 300 has the planar surface (pressing surface 301a) which is brought into contact with the outer spacer 2B and extends along the first wall 100c of the energy storage device. However, the bulging portion 300 may not have the planar surface (pressing surface 301a). For example, even when a contact surface of the bulging portion with the outer spacer 2B is a curved surface, it is sufficient that the bulging portion is formed of a plurality of bulging portions or the like and these bulging portions or the like can substantially uniformly press a portion of the first wall 100c excluding the peripheral portion (a central region of the first wall 100c). This is because although the region of the first wall 100c excluding the peripheral portion is liable to bulge when charge-discharge cycles are repeated in the energy storage device 1, the bulging portions press the region (to be more specific, apply a load in the X axis direction to the region) so that the holder 3 can firmly hold a plurality of energy storage devices 1.

What is claimed is:

1. An energy storage apparatus, comprising:
    an energy storage device;
    an outer spacer arranged adjacently to the energy storage device; and
    an end plate arranged such that the outer spacer is sandwiched between the energy storage device and the end plate,
    wherein the outer spacer comprises:
        a base extending along the adjacent energy storage device, the base defining, with the energy storage device, a passage through which a cooling fluid passes; and
        a seal portion projecting from the base and being in contact with the energy storage device, and
    wherein the end plate comprises a pressing portion disposed at a position corresponding to the seal portion, the pressing portion pressing the seal portion toward the energy storage device via the base,
    wherein the pressing portion protrudes from a surface of the end plate that faces the base to contact a surface of the base that faces the end plate,
    wherein the end plate further comprises:
        a body extending along the base; and
        a support portion for supporting the pressing portion, the support portion extending toward the outer spacer from the body.

2. The energy storage apparatus according to claim 1, wherein the pressing portion extends along the base and includes an edge of the end plate.

3. The energy storage apparatus according to claim 1, wherein the outer spacer includes a protrusion which projects toward the pressing portion from a position on the base which corresponds to the seal portion.

4. The energy storage apparatus according to claim 3, wherein the pressing portion includes an opposedly facing surface which opposedly faces the base and with which the protrusion is brought into contact, and
    wherein a contact area of the protrusion with the pressing portion is smaller than an area of the opposedly facing surface.

5. The energy storage apparatus according to claim 1, wherein the seal portion and the pressing portion extend in a flow direction of the cooling fluid in the passage.

6. The energy storage apparatus according to claim 1, wherein the pressing portion extends toward a periphery of the base from a distal end of the support portion.

7. The energy storage apparatus according to claim 1, wherein, along a stacking direction of the energy storage device, the outer spacer, and the end plate, the seal portion protrudes from another surface of the base to contact a surface of the energy storage device that faces the base, said another surface of the base opposing the surface of the base.

8. The energy storage apparatus according to claim 1, wherein the outer spacer includes a protrusion which projects from the surface of the base to contact the pressing portion, and
    wherein the pressing portion protrudes from the surface of the end plate that faces the base to contact a surface of the protrusion that faces the end plate.

9. The energy storage apparatus according to claim 8, wherein the seal portion and the protrusion extend on opposing sides of the base along a stacking direction of the energy storage device, the outer spacer, and the end plate.

10. The energy storage apparatus according to claim 8, wherein the seal portion, the protrusion, and the pressing portion are sequentially aligned along a stacking direction of the energy storage device, the outer spacer, and the end plate.

11. The energy storage apparatus according to claim 8, wherein a contact area of the protrusion with the pressing portion is less than an area of a surface of the pressing portion that faces the base.

12. The energy storage apparatus according to claim 1, wherein the seal portion includes a tapered portion such that the seal portion continuously narrows as the seal portion extends from the base toward the energy storage device.

13. The energy storage apparatus according to claim 1, wherein the end plate includes a recessed portion opening horizontally on at least one of a first surface which opposedly faces the energy storage device and a second surface on a side opposite to the first surface.

14. The energy storage apparatus according to claim 13, wherein the recessed portion includes an outwardly and downwardly inclined surface.

15. The energy storage apparatus according to claim 13, wherein the recessed portion includes an outwardly inclined surface on an edge portion of the recessed portion.

16. An energy storage apparatus, comprising:
    an energy storage device;

an outer spacer arranged adjacently to the energy storage device; and an end plate arranged such that the outer spacer is sandwiched between the energy storage device and the end plate, wherein the outer spacer comprises:
- a base extending along the adjacent energy storage device, the base defining, with the energy storage device, a passage through which a cooling fluid passes; and
- a seal portion projecting from the base and being in contact with the energy storage device, wherein the end plate comprises a pressing portion disposed at a position corresponding to the seal portion, the pressing portion pressing the seal portion toward the energy storage device via the base, wherein the pressing portion protrudes from a surface of the end plate that faces the base to contact a surface of the base that faces the end plate, wherein the end plate includes a recessed portion opening horizontally on at least one of a first surface which opposedly faces the energy storage device and a second surface on a side opposite to the first surface, and wherein the recessed portion includes an outwardly and downwardly inclined surface on a lower edge portion of the recessed portion.

17. An energy storage apparatus, comprising:
an energy storage device;
an outer spacer arranged adjacently to the energy storage device; and
an end plate arranged such that the outer spacer is sandwiched between the energy storage device and the end plate,
wherein the outer spacer comprises:
- a base extending along the adjacent energy storage device, the base defining, with the energy storage device, a passage through which a cooling fluid passes; and
- a seal portion projecting from the base and being in contact with the energy storage device, wherein the end plate comprises a pressing portion disposed at a position corresponding to the seal portion, the pressing portion pressing the seal portion toward the energy storage device via the base, wherein the pressing portion protrudes from a surface of the end plate that faces the base to contact a surface of the base that faces the end plate, wherein the end plate comprises:
- a bulging portion bulging toward the energy storage device and pressing the energy storage device; and
- a projecting portion being arranged around the bulging portion and extending toward the energy storage device, and wherein a distal end of the projecting portion is positioned more away from the energy storage device than the bulging portion in a first direction.

18. An energy storage apparatus, comprising:
an energy storage device;
an outer spacer arranged adjacently to the energy storage device; and
an end plate arranged such that the outer spacer is sandwiched between the energy storage device and the end plate,
wherein the outer spacer comprises:
- a base extending along the adjacent energy storage device, the base defining, with, the energy storage device, a passage through which a cooling fluid passes; and
- a seal portion projecting from the base and being in contact with the energy storage device, wherein the end plate comprises a pressing portion disposed at a position corresponding to the seal portion the pressing portion pressing e seal portion toward the energy storage device via the base, wherein the pressing portion protrudes from a surface of the end plate that faces the base to contact a surface of the base that faces the end plate, and wherein the seal portion includes a tapered portion that gradually narrows as the seal portion extends from the base toward the energy storage device.

* * * * *